US011115933B2

(12) United States Patent
Zhang et al.

(10) Patent No.: US 11,115,933 B2
(45) Date of Patent: Sep. 7, 2021

(54) SOUNDING REFERENCE SIGNAL POWER CONTROL FOR MULTIPLE INPUT MULTIPLE OUTPUT WIRELESS SYSTEM

(71) Applicant: NOKIA TECHNOLOGIES OY, Espoo (FI)

(72) Inventors: Yi Zhang, Beijing (CN); Yuantao Zhang, Beijing (CN); Deshan Miao, Beijing (CN); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/475,673

(22) PCT Filed: Jan. 4, 2017

(86) PCT No.: PCT/CN2017/070175
§ 371 (c)(1),
(2) Date: Jul. 2, 2019

(87) PCT Pub. No.: WO2018/126361
PCT Pub. Date: Jul. 12, 2018

(65) Prior Publication Data
US 2019/0349864 A1    Nov. 14, 2019

(51) Int. Cl.
*H04W 52/14*    (2009.01)
*H04W 52/32*    (2009.01)

(52) U.S. Cl.
CPC ....... *H04W 52/146* (2013.01); *H04W 52/325* (2013.01)

(58) Field of Classification Search
CPC . H04W 52/146; H04W 52/325; H04W 52/42; H04W 52/16; H04B 7/0408; H04B 7/0695; H04B 7/088
(Continued)

(56) References Cited

U.S. PATENT DOCUMENTS

2013/0077571 A1    3/2013    Papsakellariou et al.
2013/0102345 A1    4/2013    Jung
(Continued)

FOREIGN PATENT DOCUMENTS

CN    103945504 A    7/2014
CN    105103261 A    11/2015
(Continued)

OTHER PUBLICATIONS

International Search Report and Written Opinion for International Application No. PCT/CN2017/070175, dated Sep. 30, 2017; 11 pages.
(Continued)

*Primary Examiner* — Philip Sobutka
(74) *Attorney, Agent, or Firm* — Alston & Bird LLP

(57) ABSTRACT

A technique includes selecting, by a user device independently for each of a plurality of sounding reference signal resources, an uplink data channel power control parameter set for an uplink data channel beam pair to be used to adjust a sounding reference signal transmission power for a sounding reference signal beam pair, adjusting, by the user device for each sounding reference signal resource based on a selected uplink data channel power control parameter set, a sounding reference signal transmission power for a sounding reference signal, and transmitting, by the user device, each of a plurality of power-adjusted sounding reference signals via a corresponding sounding reference signal resource and a corresponding sounding reference signal beam pair.

33 Claims, 10 Drawing Sheets

(58) Field of Classification Search
USPC .......................................................... 455/522
See application file for complete search history.

(56) References Cited

U.S. PATENT DOCUMENTS

| 2014/0016620 A1 | 1/2014 | Singh et al. |
| 2014/0185481 A1 | 7/2014 | Seol et al. |
| 2020/0044721 A1* | 2/2020 | Choi .................. H04W 72/046 |

FOREIGN PATENT DOCUMENTS

| KR | 10-2013-0033997 | 4/2013 |
| WO | WO 2018/066727 | 4/2018 |

OTHER PUBLICATIONS

3GPP TSG RAN WG1 Meeting #87; R1-1611665; 7.1.3.1; "Multi-panel based UL MIMO transmission"; Reno, NV, U.S.A, Nov. 14-18, 2016; 3 pages.

3GPP TS 36.213; V12.6.0; 3rd Generation Partnership Project; Technical Specification Group Radio Access Network; Evolved Universal Terrestrial Radio Access (E-UTRA); Physical layer procedures (Release 12); Sophia Antipolis, France; Jun. 2015; 241 pages.

Nsenga et al.; "Joint Transmit and Receive Analog Beamforming in 60 GHz MIMO multipath channels"; IEEE International Conference on Communications; Dresden, Germany; Jun. 14-18, 2009; 5 pages.

Alkhateeb et al.; "Channel Estimation and Hybrid Precoding for Millimeter Wave Cellular Systems"; IEEE Journal of Selected Topics in Signal Processing, vol. 8, No. 5; Oct. 2014; 15 pages.

Selsa et al.; "LTE—the UMTS Long Term Evolution: From Theory to Practice"; Wiley Publishing, Second Edition, 2011; 794 pages.

Further Discussion of UL Power Control for NR, R1-1611677, 3GPP TSG RAN WG1 Meeting #87 (Nov. 2016), 3 pages.

Office Action for Japanese Application No. 2019-536550 dated Sep. 17, 2020, 5 pages.

UL Power Control for MIMO, R1-1703185, 3GPP TSG RAN WG1 Meeting #88 (Feb. 2017), 5 pages.

Office Action for Canadian Application No. 3,049,154 dated Aug. 27, 2020, 3 pages.

Extended European Search Report for Application No. 17890528.7 dated Jul. 17, 2020, 9 pages.

SRS Power Control for UL CoMP, Sharp, R1-122384, 3GPP TSG RAN WG1 Meeting #69 (May 12, 2012), 4 pages.

Power Control for Mimo, R1-1612876, 3GPP TSG-RAN WG1 Meeting #87 (Nov. 13, 2016) 4 pages.

* cited by examiner

SOUNDING REFERENCE SIGNAL POWER CONTROL FOR MULTIPLE INPUT MULTIPLE OUTPUT WIRELESS SYSTEM

CROSS-REFERENCE TO RELATED APPLICATIONS

This application is a national stage entry of International Application No. PCT/CN2017/070175 filed Jan. 4, 2017, entitled "SOUNDING REFERENCE SIGNAL POWER CONTROL FOR MULTIPLE INPUT MULTIPLE OUTPUT WIRELESS SYSTEM" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed. Other example spectrums may also be used, such as cmWave radio spectrum (3-30 GHz).

MIMO (multiple input, multiple output) is an antenna technology for wireless communications in which multiple antennas are used at both the source (transmitter) and the destination (receiver) in order to reduce errors and/or improve data speed.

SUMMARY

According to an example implementation, a method may include determining, by a base station, an uplink data channel power control parameter set for an uplink data channel beam pair, determining, by the base station, a sounding reference signal beam pair for a sounding reference signal resource, the sounding reference signal beam pair including a base station receive beam and a user device transmit beam, selecting, by the base station, the uplink data channel power control parameter set to be used by a user device to adjust a sounding reference signal transmission power, the selecting being performed based on the uplink data channel beam pair matching the sounding reference signal beam pair, and receiving, by the base station from the user device via the sounding reference signal resource and the sounding reference signal beam pair, a sounding reference signal with a sounding reference signal transmission power set based on the uplink data channel power control parameter set.

According to an example implementation, an apparatus includes at least one processor and at least one memory including computer instructions, when executed by the at least one processor, cause the apparatus to: determine, by a base station, an uplink data channel power control parameter set for an uplink data channel beam pair, determine, by the base station, a sounding reference signal beam pair for a sounding reference signal resource, the sounding reference signal beam pair including a base station receive beam and a user device transmit beam, select, by the base station, the uplink data channel power control parameter set to be used by a user device to adjust a sounding reference signal transmission power, the selecting being performed based on the uplink data channel beam pair matching the sounding reference signal beam pair, and receive, by the base station from the user device via the sounding reference signal resource and the sounding reference signal beam pair, a sounding reference signal with a sounding reference signal transmission power set based on the uplink data channel power control parameter set.

According to an example implementation, an apparatus includes means for determining, by a base station, an uplink data channel power control parameter set for an uplink data channel beam pair, means for determining, by the base station, a sounding reference signal beam pair for a sounding reference signal resource, the sounding reference signal beam pair including a base station receive beam and a user device transmit beam, means for selecting, by the base station, the uplink data channel power control parameter set to be used by a user device to adjust a sounding reference signal transmission power, the selecting being performed based on the uplink data channel beam pair matching the sounding reference signal beam pair, and means for receiving, by the base station from the user device via the sounding reference signal resource and the sounding reference signal beam pair, a sounding reference signal with a sounding reference signal transmission power set based on the uplink data channel power control parameter set.

According to an example implementation, a computer program product includes a computer-readable storage medium and storing executable code that, when executed by at least one data processing apparatus, is configured to cause the at least one data processing apparatus to perform a method including: determining, by a base station, an uplink data channel power control parameter set for an uplink data channel beam pair, determining, by the base station, a sounding reference signal beam pair for a sounding reference signal resource, the sounding reference signal beam pair including a base station receive beam and a user device transmit beam, selecting, by the base station, the uplink data device to adjust a sounding reference signal transmission power, the selecting being performed based on the uplink data channel beam pair matching the sounding reference signal beam pair, and receiving, by the base station from the user device via the sounding reference signal resource and the sounding reference signal beam pair, a sounding reference signal with a sounding reference signal transmission power set based on the uplink data channel power control parameter set.

According to an example implementation, a method may include receiving, by a user device from a base station, an uplink data channel power control parameter set for an uplink data channel beam pair, determining, by the user device, a sounding reference signal beam pair for a sounding reference signal resource, the sounding reference signal beam pair including a base station receive beam and a user device transmit beam, selecting, by the user device, the uplink data channel power control parameter set to adjust a sounding reference signal transmission power, adjusting, by the user device based on the uplink data channel power control parameter set, a sounding reference signal transmission power for a sounding reference signal to be transmitted via the sounding reference signal resource, and transmitting, by the user device, the power-adjusted sounding reference signal via the sounding reference signal resource and the sounding reference signal beam pair.

According to an example implementation, an apparatus includes at least one processor and at least one memory including computer instructions, when executed by the at least one processor, cause the apparatus to: receive, by a user device from a base station, an uplink data channel power control parameter set for an uplink data channel beam pair, determine, by the user device, a sounding reference signal beam pair for a sounding reference signal resource, the sounding reference signal beam pair including a base station receive beam and a user device transmit beam, select, by the user device, the uplink data channel power control parameter set to adjust a sounding reference signal transmission power, adjust, by the user device based on the uplink data channel power control parameter set, a sounding reference signal transmission power for a sounding reference signal to be transmitted via the sounding reference signal resource, and transmit, by the user device, the power-adjusted sounding reference signal via the sounding reference signal resource and the sounding reference signal beam pair.

According to an example implementation, an apparatus includes means for receiving, by a user device from a base station, an uplink data channel power control parameter set for an uplink data channel beam pair, means for determining, by the user device, a sounding reference signal beam pair for a sounding reference signal resource, the sounding reference signal beam pair including a base station receive beam and a user device transmit beam, means for selecting, by the user device, the uplink data channel power control parameter set to adjust a sounding reference signal transmission power, means for adjusting, by the user device based on the uplink data channel power control parameter set, a sounding reference signal transmission power for a sounding reference signal to be transmitted via the sounding reference signal resource, and means for transmitting, by the user device, the power-adjusted sounding reference signal via the sounding reference signal resource and the sounding reference signal beam pair.

According to an example implementation, a computer program product includes a computer-readable storage medium and storing executable code that, when executed by at least one data processing apparatus, is configured to cause the at least one data processing apparatus to perform a method including: receiving, by a user device from a base station, an uplink data channel power control parameter set for an uplink data channel beam pair, determining, by the user device, a sounding reference signal beam pair for a sounding reference signal resource, the sounding reference signal beam pair including a base station receive beam and a user device transmit beam, selecting, by the user device, the uplink data channel power control parameter set to adjust a sounding reference signal transmission power, adjusting, by the user device based on the uplink data channel power control parameter set, a sounding reference signal transmission power for a sounding reference signal to be transmitted via the sounding reference signal resource, and transmitting, by the user device, the power-adjusted sounding reference signal via the sounding reference signal resource and the sounding reference signal beam pair.

According to an example implementation, a method may include selecting, by a user device independently for each of a plurality of sounding reference signal resources, an uplink data channel power control parameter set for an uplink data channel beam pair to be used to adjust a sounding reference signal transmission power for a sounding reference signal beam pair, adjusting, by the user device for each of a plurality of sounding reference signal resources based on a selected uplink data channel power control parameter set, a sounding reference signal transmission power for a sounding reference signal, and transmitting, by the user device, each of a plurality of power-adjusted sounding reference signals via a corresponding sounding reference signal resource and a corresponding sounding reference signal beam pair.

According to an example implementation, an apparatus includes at least one processor and at least one memory including computer instructions, when executed by the at least one processor, cause the apparatus to: select, by a user device independently for each of a plurality of sounding reference signal resources, an uplink data channel power control parameter set for an uplink data channel beam pair to be used to adjust a sounding reference signal transmission power for a sounding reference signal beam pair, adjust, by the user device for each of a plurality of sounding reference signal resources based on a selected uplink data channel power control parameter set, a sounding reference signal transmission power for a sounding reference signal, and transmit, by the user device, each of a plurality of power-adjusted sounding reference signals via a corresponding sounding reference signal resource and a corresponding sounding reference signal beam pair.

According to an example implementation, an apparatus includes means for selecting, by a user device independently for each of a plurality of sounding reference signal resources, an uplink data channel power control parameter set for an uplink data channel beam pair to be used to adjust a sounding reference signal transmission power for a sounding reference signal beam pair, means for adjusting, by the user device for each of a plurality of sounding reference signal resources based on a selected uplink data channel power control parameter set, a sounding reference signal transmission power for a sounding reference signal, and means for transmitting, by the user device, each of a plurality of power-adjusted sounding reference signals via a corresponding sounding reference signal resource and a corresponding sounding reference signal beam pair.

According to an example implementation, a computer program product includes a computer-readable storage medium and storing executable code that, when executed by at least one data processing apparatus, is configured to cause the at least one data processing apparatus to perform a method including: selecting, by a user device independently for each of a plurality of sounding reference signal resources, an uplink data channel power control parameter set for an uplink data channel beam pair to be used to adjust a sounding reference signal transmission power for a sounding reference signal beam pair, adjusting, by the user device for each of a plurality of sounding reference signal resources based on a selected uplink data channel power control parameter set, a sounding reference signal transmission power for a sounding reference signal, and transmitting, by the user device, each of a plurality of power-adjusted sounding reference signals via a corresponding sounding reference signal resource and a corresponding sounding reference signal beam pair.

The details of one or more examples of implementations are set forth in the accompanying drawings and the description below. Other features will be apparent from the description and drawings, and from the claims.

DETAILED DESCRIPTION

Figure 1:
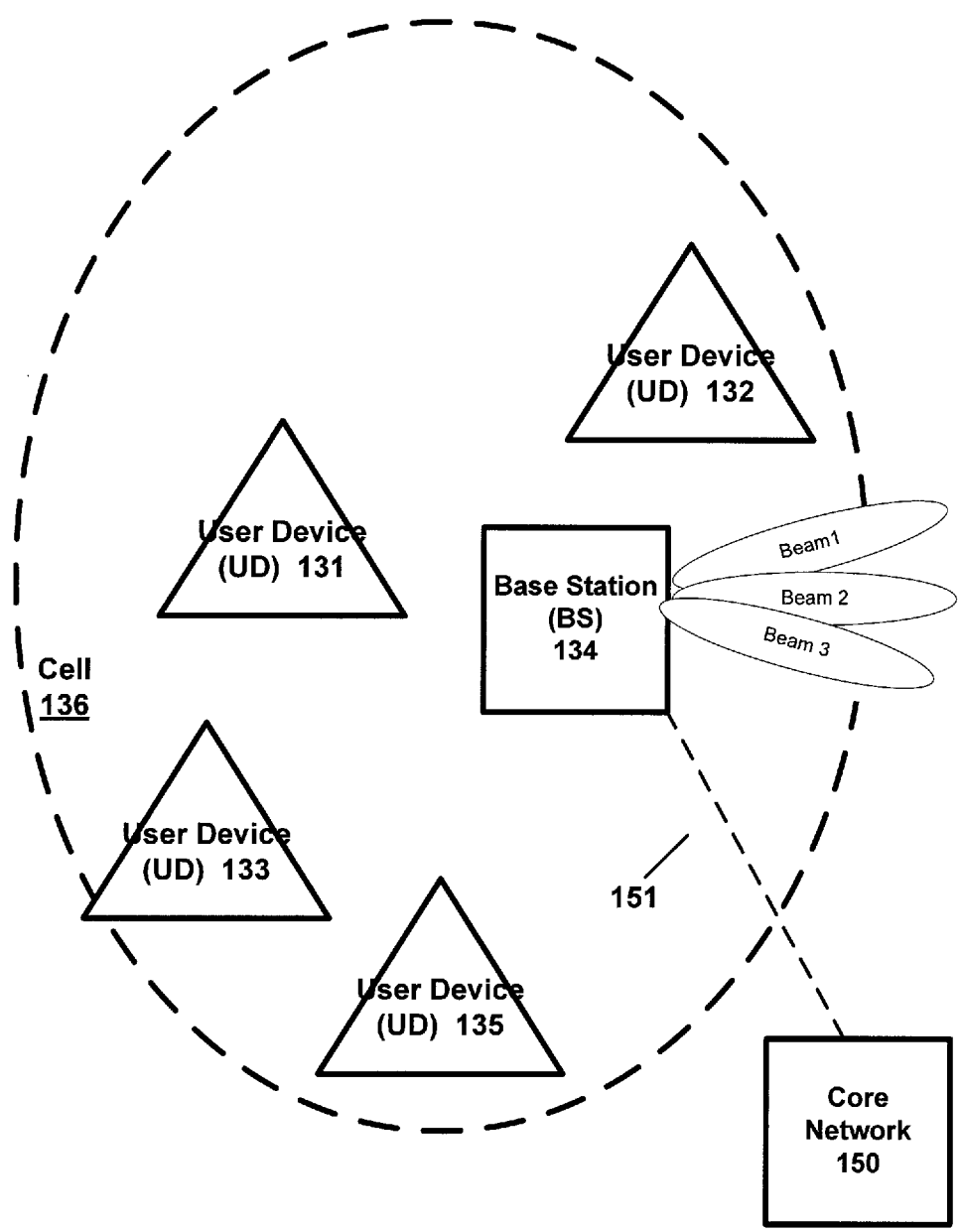
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, or any other wireless network. LTE, 5G, cmWave and mmWave band networks are provided only as illustrative examples, and the various example implementations may be applied to any wireless technology/wireless network.

Various example implementations may relate, for example, to 5G radio access systems (or other systems) with support for Massive MIMO (multiple input, multiple output) and optimized for operating in high carrier frequencies such as cmWave frequencies (e.g. from 3 GHz onwards) or mmWave frequencies, as examples, according to an illustrative example implementation. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the access point (AP)/base station (BS) and/or user device. The spectral efficiency may typically improve with the number spatial streams the system can support and thus with the number of antenna ports at the BS. According to an example implementation, spatial multiplexing may include a transmission technique in MIMO wireless communication to transmit independent and separately encoded data signals, so-called streams, from each of the multiple transmit antennas.

For example, for massive multiple input multiple output (M-MIMO) system, a large number of antenna elements may typically be used at a transmitter and/or receiver (e.g., at a base station/access point or other network node). M-MIMO may typically have more spatial links/layers and provides more spatial degrees of freedom. In an illustrative example, with well designed antenna weights, a MIMO or M-MIMO transmitter can generate relatively narrow beams with good spatial separation. Thus, such a transmitter can achieve greater beamforming gain, reduce the spatial interference range and obtain greater multiple user spatial multiplexing gain. A MIMO or M-MIMO system may typically have better performance in terms of data rate and link reliability compared with other systems.

For example, as shown in FIG. 1, to cover a cell, multiple beams are typically used, such as beam 1, beam 2, beam 3 up to N beams, for example. However, in many cases, only a subset of beams can be active at the same time, e.g., to reduce cost and complexity. Thus, beam sweeping may be used to transmit signals over each of a plurality of beams or sets of beams over multiple time periods. Beam sweeping may include activating each beam or a set of beams over multiple time periods. Also, a user device may perform beam management (or beam tracking) in which the user device may measure reference signals for each beam, and then may send a beam report to the BS that identifies one or more preferred beams (e.g., identifying one or more preferred or best downlink transmit beams, which may, for example, be a beam having a highest received power or received signal strength or other channel quality measurement). Thus, for example, beam sweeping may be performed to generate or activate each of a plurality of sets of beams in the time domain in order to transmit signals across a cell or to receive signals via different beams. For example, only one beam may be active, or a set of beams (e.g., 3 beams, 4 beams, 6 beams, or some other number of beams) may be active at a time, depending on the implementation. Various control signals, such as reference signals (RSs), may be transmitted or received by a user device or BS for typically only one beam at a time or only one set of beams at a time, for example.

A transmission between a user device and a BS may be communicated via a beam pair, which may include a beam applied by a BS and a beam applied by a user device. For example, for an uplink transmission from a user device to the BS, a beam pair may include a transmit beam applied by a user device and a receive beam applied by the BS. Likewise, for a downlink transmission, a beam pair may be used including a transmit beam applied by a BS and a receive beam applied by a user device.

According to an example implementation, one or more user devices may transmit uplink data to a BS via an uplink data channel, such as, for example, via a physical uplink shared channel (PUSCH) channel. According to an example implementation, an uplink data channel (e.g., PUSCH) power control parameter set may be used by a user device to perform power control, e.g., to adjust a transmit power for data (or other signals) transmitted by the user device via the uplink data channel (e.g., via a PUSCH channel). A different (or beam-specific) uplink data channel (e.g., PUSCH) power control parameter set may be selected or determined for each of a plurality of beam pairs (e.g., a different power control parameter set for each of a plurality of uplink data channel beam pairs or PUSCH beam pairs). For example, each different uplink data channel (or PUSCH) power control parameter set may include at least one parameter which is a different value from (one or more, or even all) other uplink data channel power control parameter sets.

Thus, for example, a different (or beam-specific) PUSCH power control parameter set may be determined or obtained for each of a plurality of PUSCH beam pairs, e.g., to allow a user device to adjust transmit power for transmitting data over the PUSCH channel via the corresponding beam pair. As noted, for an uplink transmission (from the user device to a BS), a beam pair may include a transmit beam for (or applied by) a user device and a receive beam for (or applied by) a BS. For example, a PUSCH power control parameter set for a beam pair (or for each of a plurality of beam pairs) may be used by a user device to perform power control, e.g., to adjust a transmission (or transmit) power of uplink data transmitted uplink via the PUSCH (or uplink data channel).

In general, power control for the transmission of signals may be useful to avoid unnecessary interference and to reduce power consumption, for example.

According to an example implementation, a user device may transmit (uplink) sounding reference signals (SRS) to a BS. For example, sounding reference signals (SRS) may be transmitted by a user device to a BS to allow the BS to estimate an uplink channel state at different frequencies. According to an example implementation, the channel state estimates may be used, for example, by the BS scheduler to assign resource blocks that have good channel quality for uplink PUSCH transmission (e.g., uplink channel-dependent scheduling), as well as to select different transmission parameters (e.g., such as data rate and different parameters related to uplink multi-antenna transmission. SRS signals may include, for example, periodic SRS signals that may be transmitted at regular intervals or a specific period, and aperiodic SRS signals which are not periodic (e.g., not transmitted at regular intervals).

According to an example implementation, a SRS signal may be transmitted via a plurality of different time-frequency resources. Due to time-varying and/or frequency-varying channel conditions, a different beam pair may be determined for each SRS resource. Thus, for example, each SRS signal, transmitted via a different SRS resource, may have or be transmitted via a different beam pair (e.g., including an uplink beam for the user device and a receive beam for a BS). Thus, in this regard, there may be a different beam pair for each SRS resource.

In addition, power control may also be applied for each SRS signal, e.g., the transmit power for each SRS signal may be adjusted. According to an example implementation, a user device may determine, independently for each of a plurality of SRS resources, an uplink data channel (e.g., PUSCH) channel power control parameter set to be used to adjust power for the transmission of a SRS signal. Thus, for example, a PUSCH power control parameter set selected for use by a user device to adjust a sounding reference signal transmit power may be selected for each SRS resource (or for each SRS signal). The PUSCH power control parameter set selected to be used for power control of a SRS signal may be referred to as a linked PUSCH power control parameter set, e.g., because this PUSCH power control parameter set provides a link or relationship between the PUSCH transmission power and the SRS signal transmission power, for example. Because a separate or independent beam pair may be provided for each different SRS resource (for a SRS signal transmitted via different SRS resources), a different and/or independent PUSCH power control parameter set may be selected or determined to be used for power control for each SRS resource/SRS signal.

According to an example implementation, a linked PUSCH power control parameter set for a PUSCH beam pair may be selected for use in performing power control for a SRS signal/SRS signal resource, where there is a match between the PUSCH beam pair and the SRS beam pair. Thus, for example, a beam pair of a SRS signal or SRS resource may be matched (e.g., having a same transmit beam and receive beam) to a PUSCH beam pair. Then, the PUSCH power control parameter set for the matching PUSCH beam pair may be selected as a linked PUSCH power control parameter set for use by a user device in adjusting SRS signal transmit power for the SRS resource.

According to an example implementation, different techniques may be used by a user device to select or determine a linked PUSCH power control parameter set for a SRS resource. For example, the user device may implicitly determine (e.g., based on matching beam pairs between PUSCH beam pair and SRS beam pair) a linked PUSCH power control parameter set for a (or for each) SRS resource by: 1) determining that a PUSCH (or uplink data channel) beam pair matches a SRS beam pair, and then 2) selecting the PUSCH power control parameter set for a PUSCH (or uplink data channel) beam pair for adjusting a SRS transmission power (for a SRS resource) for the SRS signal having a SRS beam pair that matches a PUSCH beam pair. Alternatively, a user device may explicitly determine (e.g., based on a control information received from a BS) a linked PUSCH (or uplink data channel) power control parameter set by: 1) receiving, from a BS, a control information indicating, for each of a plurality of SRS resources, a PUSCH power control parameter set to be used to adjust SRS transmission power, and 2) selecting, based on the received control information for each of a plurality of SRS resources, a linked PUSCH power control parameter set to be used for power control for each of a plurality of SRS signals or SRS resources.

According to an example implementation, the control information from a BS that indicates a linked PUSCH power control parameter set for each of a plurality of SRS signals/SRS resources may be communicated via higher layer signals (e.g., via radio resource control (RRC) signaling) for periodic SRS signals, and may be communicated to a user device via lower layer signaling (e.g., via physical downlink control channel (PDCCH) downlink control information (DCI)) for aperiodic SRS signals.

In addition, a user device may receive from a BS, information identifying a numerology for a SRS transmission (e.g., to be used for SRS signal power control). For example, for a different numerology, there may be a different linked PUSCH power control parameter set. Also, for PUSCH power control parameter set for a PUSCH beam pair and linked PUSCH power control parameter set for a SRS resource/SRS beam pair may have the same numerology. Numerology, for example, may include different quantity, length or spacing information for one or more transmission or communication characteristics. Thus, for example, numerology may include, by way of illustrative example, subcarrier spacing, subframe (or slot) length, OFDM symbol time period, or other time/frequency characteristics. Thus, for example, at least in some cases, because a 5G BS or user device may also be backwards compatible with LTE/4G or other standard, the 5G radio/network device may support different numerologies (e.g., a 5G numerology, and a 4G numerology).

In addition, a user device may receive a channel state information-reference signal (CSI-RS), and the user device may measure or determine a pathloss, e.g., determine a pathloss for each of a plurality of beam pairs. A user device may also receive from a BS an indication of a SRS power offset (e.g., with respect to PUSCH signal transmission power) that may be used in setting or adjusting a SRS transmission power. Thus, in an example implementation, a user device may adjust or set a transmission power for a (or for each) SRS signal based on, e.g., a linked PUSCH power control parameter set for the SRS signal/SRS resource, a numerology for the SRS signal/SRS resource, the power offset (e.g., SRS power offset) and a pathloss (e.g., a pathloss for or corresponding to the SRS beam pair).

Also, as noted above, a user device may perform beam sweeping for beam management (e.g., where the user device receives and measures signals for different beams/beam pairs, and may select or report one or more preferred or best beam pairs or best/preferred downlink transmit beams to a BS), e.g., in order to report updated preferred (or best) beam information to a BS. When setting a SRS transmission power for beam sweeping for beam management, a user device may select/use one linked PUSCH power control parameter set for all (or for multiple) SRS beam pairs (rather than using a different or beam-specific PUSCH power control parameter set). For example, the user device may select/use a PUSCH power control parameter set that was recently used to transmit data via the PUSCH channel, as a linked PUSCH power control parameter set for all (or for at least multiple) SRS signals/SRS resources, during beam sweeping for beam management. This is because, for example, during beam management, the user device may not know a best or preferred beam pair(s) for different resources. According to another example, a user device may select a linked PUSCH power control parameter set that has been signaled or indicated by the BS to the user device.

Example 1

Figure 2:
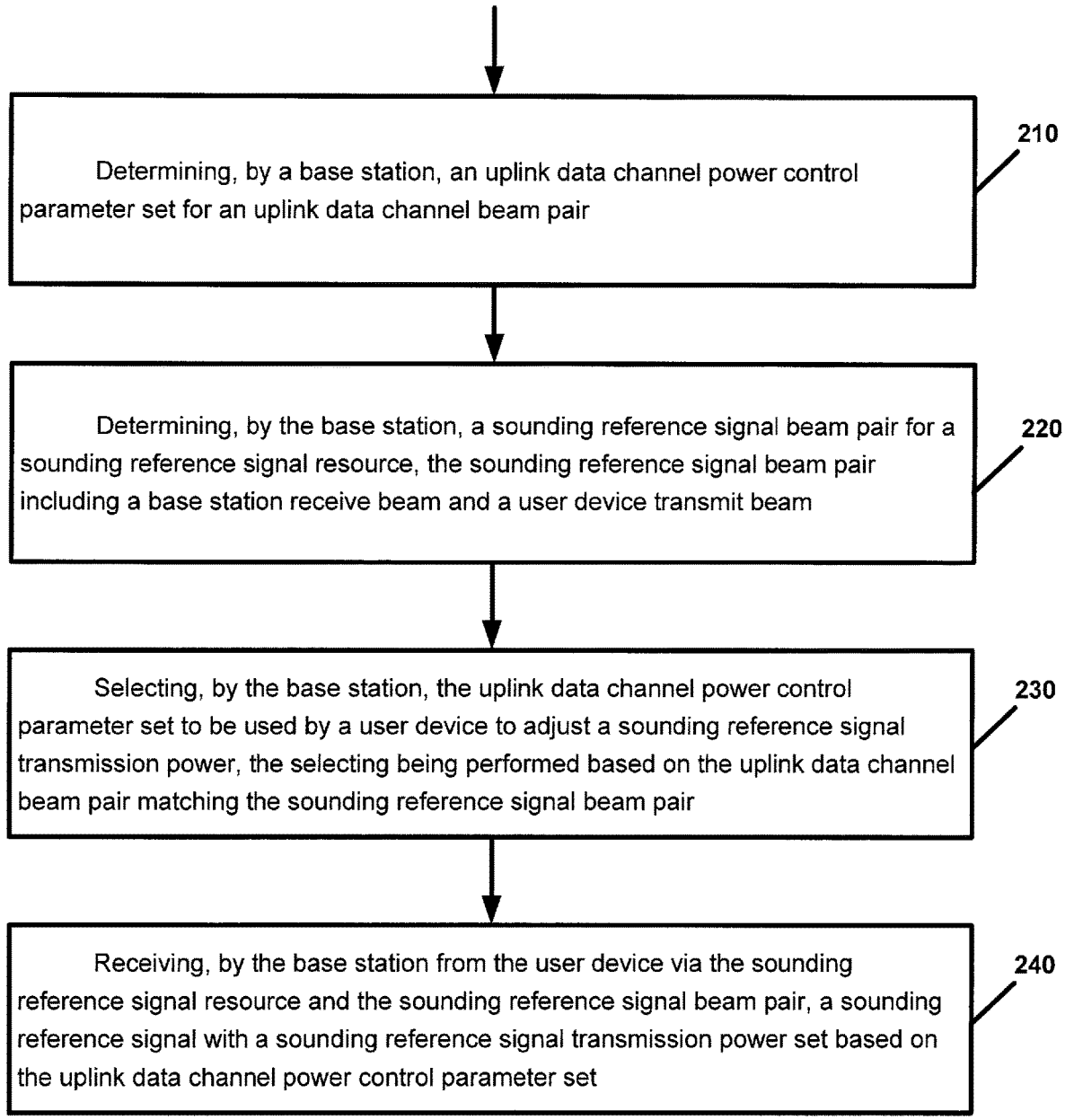
FIG. 2 is a flow chart illustrating operation of a base station according to an example implementation.

FIG. 2 is a flow chart illustrating operation of a base station according to an example implementation. Operation 210 includes determining, by a base station, an uplink data channel power control parameter set for an uplink data channel beam pair. Operation 220 includes determining, by the base station, a sounding reference signal beam pair for a sounding reference signal resource, the sounding reference signal beam pair including a base station receive beam and a user device transmit beam. Operation 230 includes selecting, by the base station, the uplink data channel power control parameter set to be used by a user device to adjust a sounding reference signal transmission power, the selecting being performed based on the uplink data channel beam pair matching the sounding reference signal beam pair. And, operation 240 includes receiving, by the base station from the user device via the sounding reference signal resource and the sounding reference signal beam pair, a sounding reference signal with a sounding reference signal transmission power set based on the uplink data channel power control parameter set.

Example 2

According to an example implementation of example 1, the determining an uplink data channel power control parameter set includes determining an uplink data channel power control parameter set for each of a plurality of uplink data channel beam pairs, including determining a first uplink data channel power control parameter set for a first uplink data channel beam pair and a second uplink data channel power control parameter set for a second uplink data channel beam pair; the determining a sounding reference signal beam pair for a sounding reference signal resource includes determining a sounding reference signal beam pair for each of a plurality of sounding reference signal resources, including: determining a first sounding reference signal beam pair for a first sounding reference signal resource; and determining a second sounding reference signal beam pair for a second sounding reference signal resource; and the selecting includes: selecting, based on a match between the first uplink data channel beam pair and the first sounding reference signal beam pair, the first uplink data channel power control parameter set for the first uplink data channel beam pair to be used by the user device to adjust a sounding reference signal transmission power for the first sounding reference signal resource; and selecting, based on a match between the second uplink data channel beam pair and the second sounding reference signal beam pair, the second uplink data channel power control parameter set for the second uplink data channel beam pair to be used by the user device to adjust a sounding reference signal transmission power for the second sounding reference signal resource.

Example 3

According to an example implementation of any of examples 1-2, the uplink data channel power control parameter set for an uplink data channel beam pair includes a physical uplink shared channel (PUSCH) power control parameter set for a PUSCH beam pair.

Example 4

According to an example implementation of any of examples 1-3, the method further including sending, by the base station to the user device, a control information identifying the uplink data channel power control parameter set to be used to adjust the sounding reference signal transmission power.

Example 5

According to an example implementation of any of examples 1-4, the control information is sent via higher layer signaling for periodic sounding reference signal; and the control information is sent via lower layer signaling for aperiodic sounding reference signal.

Example 6

According to an example implementation of any of examples 1-5, the control information is sent via a radio resource control (RRC) signaling for periodic sounding reference signal; and the control information is sent via a physical downlink control channel (PDCCH) downlink control information (DCI) for aperiodic sounding reference signal.

Example 7

According to an example implementation of any of examples 1-6, the control information comprises control information, provided via physical downlink control channel (PDCCH) downlink control information (DCI), that identifies: 1) a sounding reference signal parameter set, which was configured by a higher layer signaling, to be used for transmitting the sounding reference signal, and 2) the uplink data channel power control parameter set to be used to adjust the sounding reference signal transmission power.

Example 8

According to an example implementation of any of examples 1-3, the method further including sending, by the base station to the user device, information identifying a numerology to be used by the user device for sounding reference signal transmission.

Example 9

According to an example implementation of any of examples 1-8, and further including: sending, by the base station to the user device, information identifying a power offset for the sounding reference signal transmission power with respect to the uplink data channel.

Example 10

According to an example implementation of any of examples 1-9, and further including sending, by the base station to the user device, channel state information-reference signals to allow the user device to determine a pathloss for one or more beam pairs.

Example 11

According to an example implementation an apparatus includes at least one processor and at least one memory including computer instructions, when executed by the at least one processor, cause the apparatus to perform a method of any of examples 1-10.

Example 12

An apparatus includes means for performing the method of any of examples 1-10.

Example 13

An apparatus including a computer program product including a non-transitory computer-readable storage medium and storing executable code that, when executed by at least one data processing apparatus, is configured to cause the at least one data processing apparatus to perform a method of any of examples 1-10.

Example 14

Figure 3:
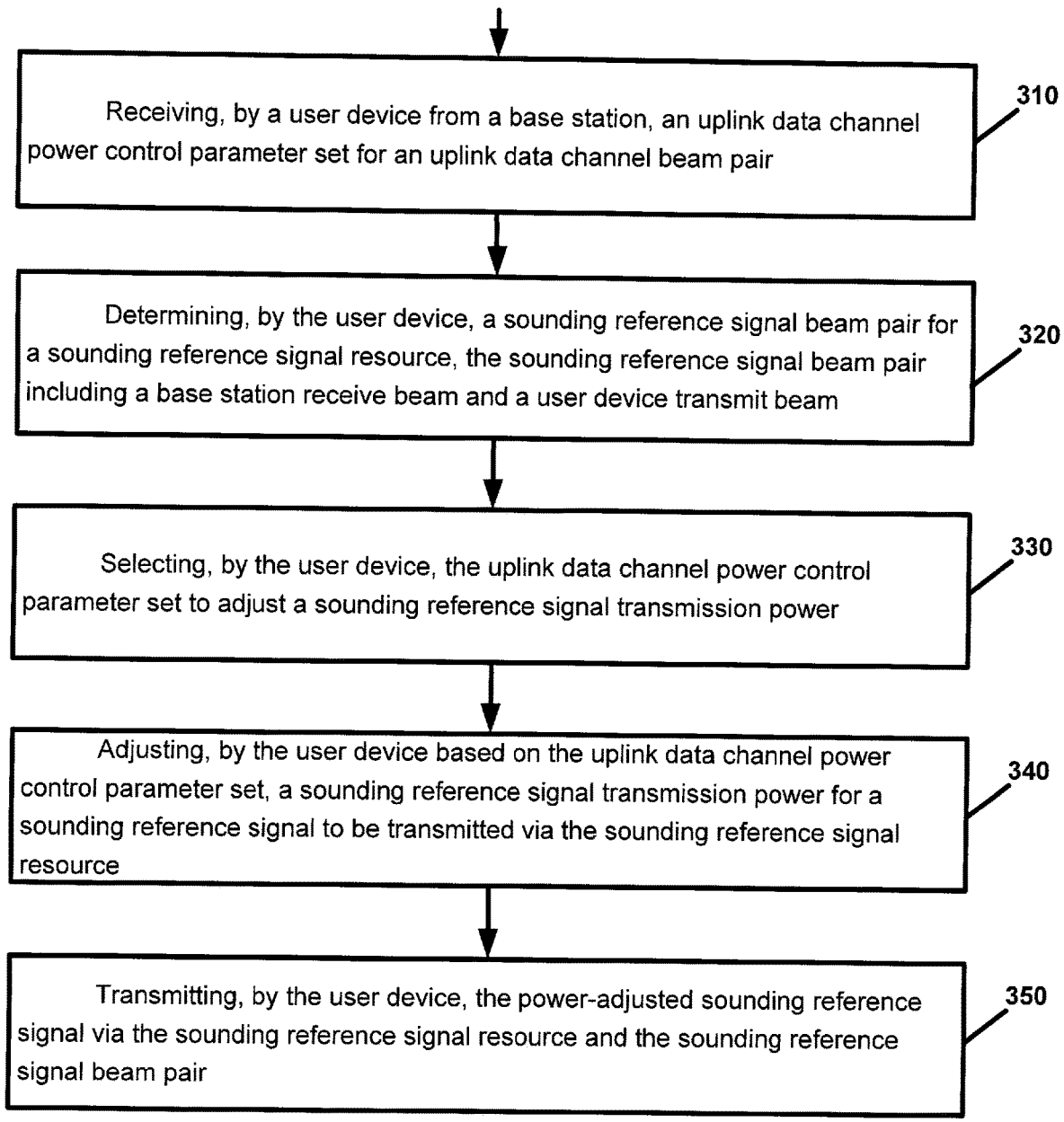
FIG. 3 is a flow chart illustrating operation of a user device according to an example implementation.

FIG. 3 is a flow chart illustrating operation of a user device according to an example implementation. Operation 310 includes receiving, by a user device from a base station, an uplink data channel power control parameter set for an uplink data channel beam pair. Operation 320 includes determining, by the user device, a sounding reference signal beam pair for a sounding reference signal resource, the sounding reference signal beam pair including a base station receive beam and a user device transmit beam. Operation 330 includes selecting, by the user device, the uplink data channel power control parameter set to adjust a sounding reference signal transmission power. Operation 340 includes adjusting, by the user device based on the uplink data channel power control parameter set, a sounding reference signal transmission power for a sounding reference signal to be transmitted via the sounding reference signal resource. And, operation 350 includes transmitting, by the user device, the power-adjusted sounding reference signal via the sounding reference signal resource and the sounding reference signal beam pair.

Example 15

According to an example implementation of example 14, the receiving an uplink data channel power control parameter set includes receiving an uplink data channel power control parameter set for each of a plurality of uplink data channel beam pairs, including: receiving a first uplink data channel power control parameter set for a first uplink data channel beam pair; and receiving a second uplink data channel power control parameter set for a second uplink data channel beam pair; the determining a sounding reference signal beam pair includes determining a sounding reference signal beam pair for each of a plurality of sounding reference signal resources, including: determining a first sounding reference signal beam pair for a first sounding reference signal resource; and determining a second sounding reference signal beam pair for a second sounding reference signal resource; wherein the selecting includes selecting, the first uplink data channel power control parameter set to adjust a sounding reference signal transmission power for the first sounding reference signal resource and the second uplink data channel power control parameter set to adjust a sounding reference signal transmission power for the second sounding reference signal resource.

Example 16

According to an example implementation of any of examples 14-15, the selecting includes: determining, by the user device, that the uplink data channel beam pair matches the sounding reference signal beam pair; and selecting, by the user device based on the uplink data channel beam pair matching the sounding reference signal beam pair, the uplink data channel power control parameter set to adjust a sounding reference signal transmission power.

Example 17

According to an example implementation of any of examples 14-16, the selecting includes: receiving, by the user device from the base station, a control information indicating that the uplink data channel power control parameter set should be used to adjust a sounding reference signal transmission power; and selecting, by the user device based on the received control information, the uplink data channel power control parameter set to adjust a sounding reference signal transmission power.

Example 18

According to an example implementation of any of examples 14-17, the uplink data channel power control parameter set for an uplink data channel beam pair comprises a physical uplink shared channel (PUSCH) power control parameter set for a PUSCH beam pair.

Example 19

According to an example implementation of any of examples 14-18, the control information is received via higher layer signaling for periodic sounding reference signal; and the control information is received via lower layer signaling for aperiodic sounding reference signal.

Example 20

According to an example implementation of any of examples 14-19, the control information is received via a radio resource control (RRC) signaling for periodic sounding reference signal; and the control information is received via a physical downlink control channel (PDCCH) downlink control information (DCI) for aperiodic sounding reference signal.

Example 21

According to an example implementation of any of examples 14-20, the control information includes control information, provided via physical downlink control channel (PDCCH) downlink control information (DCI), that identifies: 1) a sounding reference signal parameter set, which was configured by a higher layer signaling, to be used for transmitting the sounding reference signal, and 2) the uplink data channel power control parameter set to be used to adjust the sounding reference signal transmission power.

Example 22

According to an example implementation of any of examples 14-21, and further including receiving, by the user device, information identifying a numerology to be used by the user device for sounding reference signal transmission; receiving, by the user device, information identifying a power offset for the sounding reference signal transmission power with respect to the uplink data channel; and receiving, by the user device, channel state information-reference signals to allow the user device to determine a pathloss corresponding to the sounding reference signal beam pair; determining a pathloss corresponding to the sounding reference signal beam pair based on the channel state information-reference signals; and wherein the adjusting comprises adjusting, by the user device, a sounding reference signal transmission power based on the uplink data channel power control parameter set, the numerology, the power offset, and the pathloss.

Example 23

According to an example implementation of any of examples 14-22, and further including receiving, by the user device, information identifying a numerology to be used by the user device for sounding reference signal transmission, wherein the sounding reference signal and the uplink data channel that use a same beam pair have the same numerology.

Example 24

According to an example implementation of any of examples 14-23, and further including using one uplink data channel power control parameter set to adjust sounding reference signal transmission power for each of a plurality of sounding reference signal beams when performing beam sweeping for beam management.

Example 25

According to an example implementation of any of examples 14-24, the one uplink data channel power control parameter set comprises an uplink data channel power control parameter set that was used to transmit uplink data to the base station via the uplink data channel.

Example 26

An apparatus includes at least one processor and at least one memory including computer instructions, when executed by the at least one processor, cause the apparatus to perform a method of any of examples 14-25.

Example 27

An apparatus including means for performing the method of any of claims 14-25.

Example 28

Figure 4:
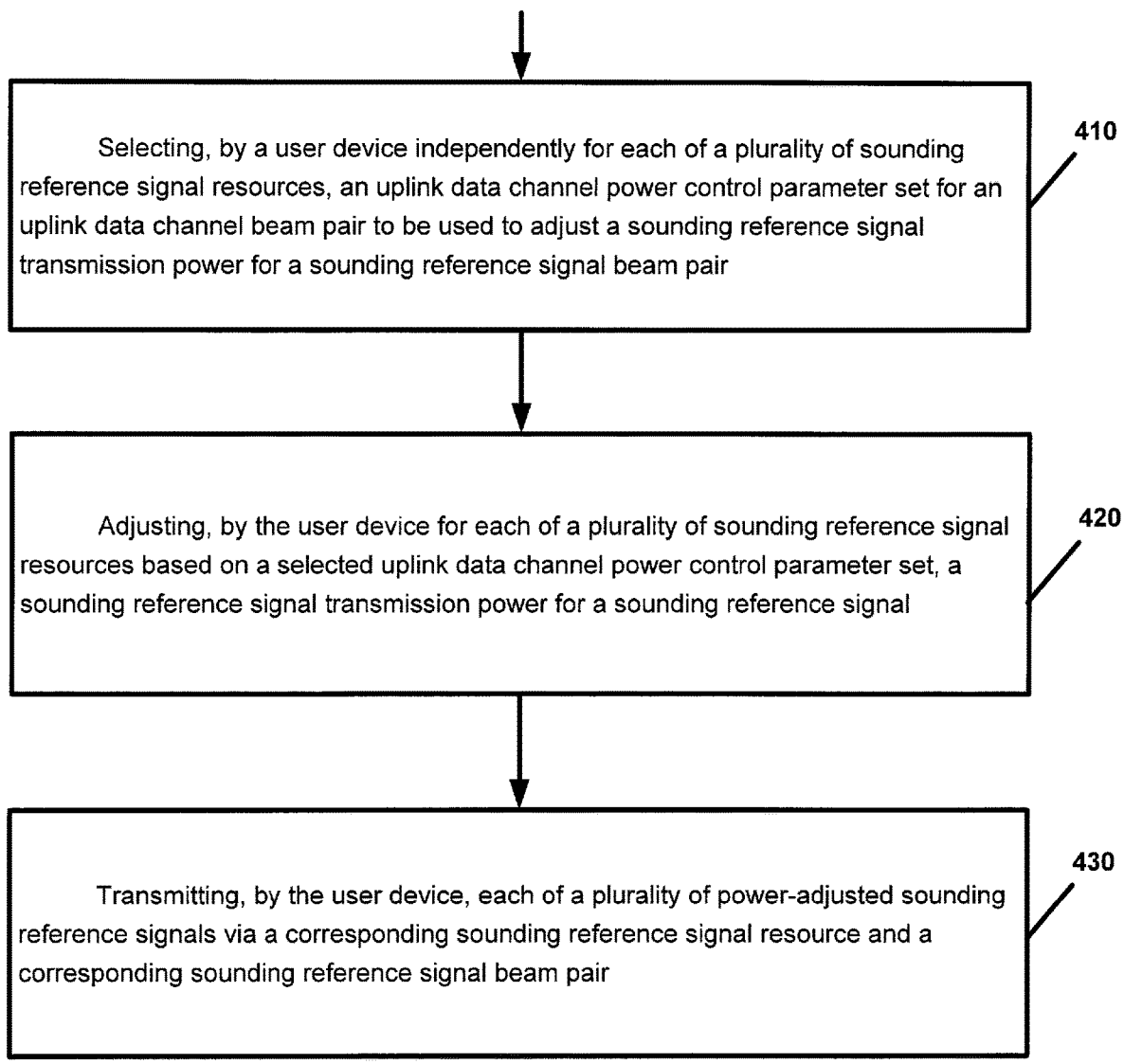
FIG. 4 is a flow chart illustrating operation of a user device according to another example implementation.

FIG. 4 is a flow chart illustrating operation of a user device according to another example implementation. Operation 410 includes selecting, by a user device independently for each of a plurality of sounding reference signal resources, an uplink data channel power control parameter set for an uplink data channel beam pair to be used to adjust a sounding reference signal transmission power for a sounding reference signal beam pair. Operation 420 includes adjusting, by the user device for each of a plurality of sounding reference signal resources based on a selected uplink data channel power control parameter set, a sounding reference signal transmission power for a sounding reference signal. Operation 430 includes transmitting, by the user device, each of a plurality of power-adjusted sounding reference signals via a corresponding sounding reference signal resource and a corresponding sounding reference signal beam pair.

Example 29

According to an example of example 28, the selecting includes: determining independently for each of a plurality of sounding reference signal resources, that an uplink data channel beam pair matches a sounding reference signal beam pair; and selecting, by the user device based on the uplink data channel beam pair matching the sounding reference signal beam pair, the uplink data channel power control parameter set for an uplink data channel beam pair to adjust a sounding reference signal transmission power for a sounding reference signal having a sounding reference signal beam pair that matches the uplink data channel beam pair.

Example 30

According to an example implementation of any of examples 28-29, the selecting includes: receiving, by the user device from the base station, a control information indicating, for each of a plurality of sounding reference signal resources, an uplink data channel power control parameter set to be used to adjust a sounding reference signal transmission power; and selecting, by the user device based on the received control information for each of the plurality of sounding reference signal resources, the uplink data channel power control parameter set to adjust a sounding reference signal transmission power.

Example 31

According to an example implementation of any of examples 28-30, an uplink data channel power control parameter set for each uplink data channel beam pair includes a physical uplink shared channel (PUSCH) power control parameter set for a PUSCH beam pair.

Example 32

An apparatus including at least one processor and at least one memory including computer instructions, when executed by the at least one processor, cause the apparatus to perform the method of any of examples 28-31.

Example 33

An apparatus including means for performing the method of any of examples 28-31.

Various example implementations are related to (e.g., 5G) wireless systems with support for Massive MIMO (m-MIMO). Those systems are characterized by more antenna number, finer beamforming and higher antenna gain. In detail, it is related to an enhanced SRS (sounding reference signal) power control scheme based on a flexible beam switching at both transmit and/or receive side. With an improved or more accurate SRS power control mechanism, the SRS capacity can be increased because of less interference from neighbor cells. Also, the power consumption of a UE may be reduced.

In an example implementation, power control for SRS signals are linked with that for PUSCH signals by one offset value in general. In detail, SRS power control may be specified as, or at least based on, the following equation:

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \text{ [dBm]},$$

where $P_{CMAX,c}(i)$ is the configured maximal allowed transmit power for a specific cell c; $M_{SRS,c}(i)$ is the number of uplink PRBs (physical resource blocks) for SRS transmission; $P_{O\_PUSCH,c}(j)$ (for each UE) is the semi-static nominal power for PUSCH; $PL_c$ is downlink pathloss estimated (each beam may have specific pathloss) in the UE for serving cell c in dB; $\alpha_c(j)$ is a cell specific pathloss compensation factor to achieve balance between cell average and cell edge throughput; $f_c(i)$ is the PUSCH close loop power adjustment part for serving cell c; $P_{SRS\_OFFSET,c}(m)$ is the offset value for power adjustment relative to PUSCH power control, which is semi-statically configured by higher layers (e.g., by RRC signalling). For periodic and aperiodic SRS, two independent offset values may be used.

By way of illustrative example, a PUSCH power control parameter set, which may include one or more parameters that may be used to determine a transmit power of a PUSCH signal, may include one or more, or even all, (and may include additional parameters) including: $M_{SRS,c}(i)$, $PL_c$ $\alpha_c(j)$ and/or $f_c(i)$. As described in greater detail herein, a linked PUSCH power control parameter set may be selected for use in adjusting a sounding reference signal transmit power for each of one or more SRS signals/SRS resources, e.g., based on beam pairs used by a PUSCH signal and the SRS signal/SRS resource.

There may be a plurality (or multiple) of PUSCH power control parameter sets, with a PUSCH power control parameter set for each PUSCH beam pair, and a linked PUSCH power control parameter set for a SRS beam pair. This may allow or provide for an independent relationship between SRS power and PUSCH power for different beam pairs. There may be different cases for the power control parameter sets, where one or more of the parameters may be different, and/or one or more parameters may be in common among all or multiple power control parameters sets. Below are a few illustrative example cases.

Case 1: PUSCH power control parameter set including: independent pathloss; and other parameters (P0_PUSCH, alpha) may be common for all parameter sets or beam pairs; and, there may be one process to determine fc for all the parameter sets/beam pairs); and, a power offset value can be same or different for different parameter sets.

Case 2: Parameter set including: p0, alpha, pathloss and fc, offset, where all the parameters are independent for different beam pairs/parameter sets, where each parameter set may be for or associated with one beam pair; thus, case 2 involves the most general case where each parameter set includes independent parameters for all of the parameters.

Case 3: Parameter set may include independent pathloss and fc; and P0_PUSCH and alpha are common for all the parameter sets; and power offset value can be same or different for different parameter sets. Various example implementations are described for an enhanced SRS power control scheme on account of flexible uplink/downlink beams for SRS transmission.

According to an example implementation, both transmit and/or receive beams may be flexibly changed according to network requirements and channel transmission conditions, for example. For example, for a UE, a beam pair (transmit beam and/or receive beam) for PUSCH and a beam pair for SRS may be different (e.g., may be different in homogeneous networks). Thus, for example, beam pair for SRS may not be the same as beams (beam pair) used for a most recent uplink transmission for PUSCH (uplink data channel). Rather according to an example implementation, the beam pairs for PUSCH and SRS may vary independently.

Figure 5:
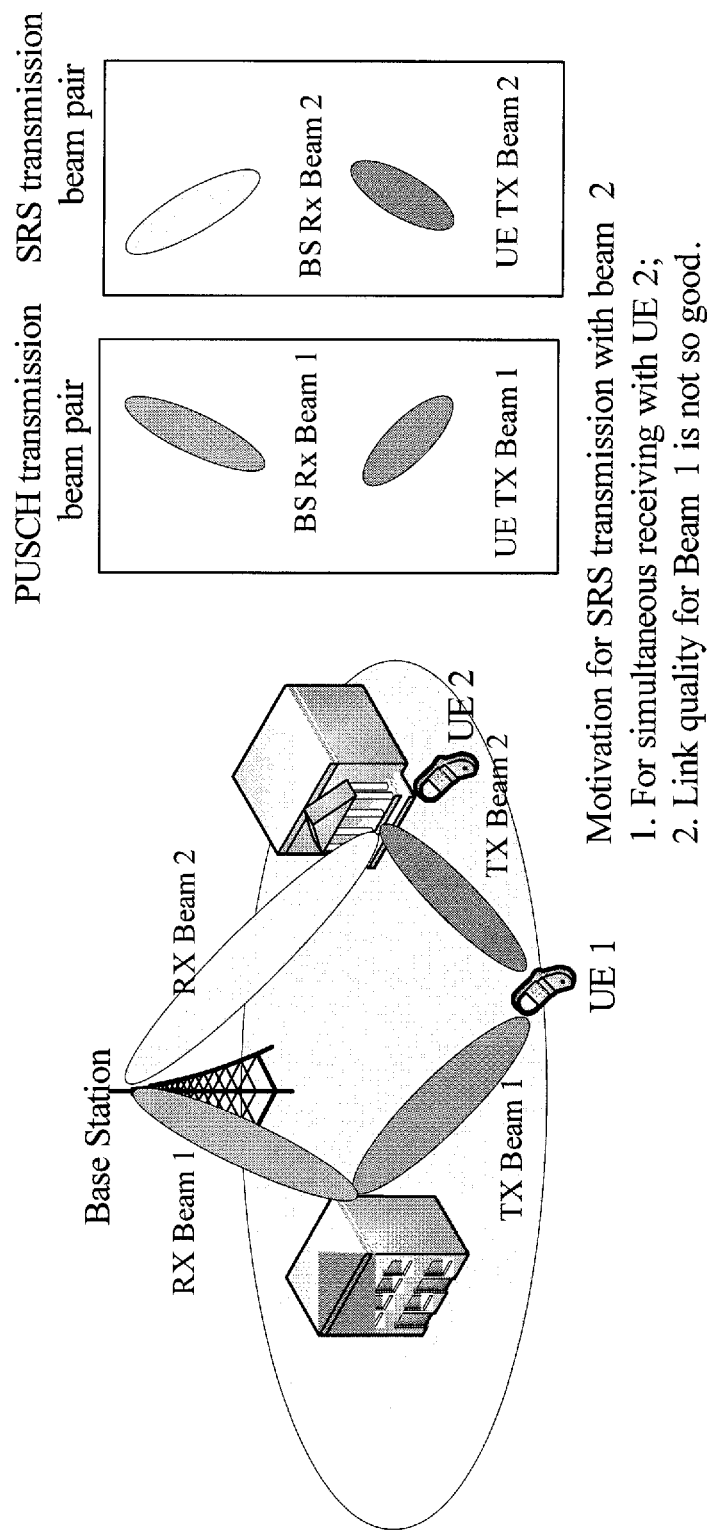
FIG. 5 is a diagram illustrating different beam pairs for PUSCH and SRS according to an example implementation.

FIG. 5 is a diagram illustrating different beam pairs for PUSCH and SRS according to an example implementation. Scenario 1: When multiple UEs are multiplexed for transmission, their requirement for receiving beam may not be aligned. For some UEs, the sub-optimum gNB (5G BS) receive beam may be selected to guarantee (or provide) multiplexing with other UEs. As one example shown in FIG. 5, UE1 may need to change the PUSCH transmit beam from beam 1 to beam 2 for (or to accommodate) multiplexing with UE2 in one subframe although the link with beam 1 has better channel quality. If SRS is triggered to obtain the CSI (channel state information) for the link with beam 2, the beam for SRS transmission will be different from that for previous PUSCH transmission, e.g. beam 1 (e.g., because BS can only use 1 RX/receive beam at a time).

Figure 6:
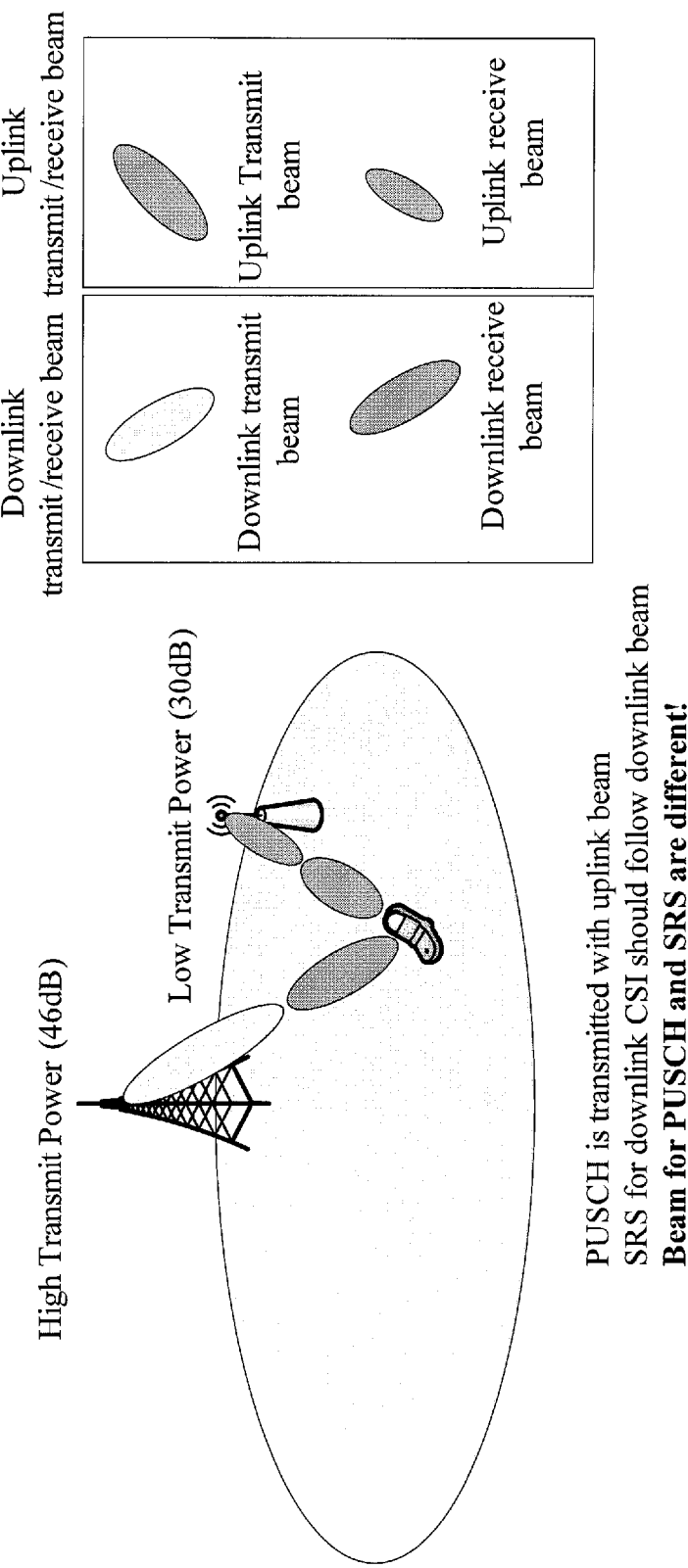
FIG. 6 is a diagram illustrating different beam pairs for PUSCH and SRS signals in heterogeneous network.

FIG. 6 is a diagram illustrating different beam pairs for PUSCH and SRS signals in heterogeneous network. Scenario 2: As shown in FIG. 6, when gNB (5G BS) finds the link quality for beam 1 is not very good, the gNB may seek or want to obtain the CSI for other beams. In this case, gNB/BS may then trigger SRS transmission with desired beams, which may be different from the beams used by recent PUSCH transmission. In this example, different transmission power may be used in heterogeneous network (e.g., including different transmit/receive points, different BSs) may cause different transmit powers, and thus, different beams for PUSCH and SRS. Transmit beam and/or receive beam for PUSCH and SRS may be different in heterogeneous (multiple transmission points, e.g., each UE) network. For example, SRS can be used for obtaining downlink CSI by exploiting channel reciprocity. Since the transmit power may be different for different transmission points, the beams for downlink and uplink may be different. As shown in FIG. 6, SRS is used for obtaining downlink CSI and is linked with downlink beam, which is not the same as uplink beam for PUSCH. Thus, for example, a higher transmit power DL (downlink); SRS must be TX (transmitted) with same beam as DL data; SRS signals may be used by BS to obtain DL CSI based on channel reciprocity, for example. Thus, for example, different beam pairs (or at least independent beam pairs) may be used or needed for PUSCH and SRS.

Impact of Multiple SRS Resources

According to an example implementation, multiple SRS resources (K>1) (multiple time-frequency SRS resources for transmitting SRS signal) may be configured for one UE according to UE capability. Different SRS resources can be used for realizing different functions, such as obtaining uplink and downlink CSI, uplink beam management (how to select and report uplink and downlink beam pair). For example, on account of multiple functions and requirements, the beamforming (beam pair) or precoding on different SRS resources may be different. Different precoding may be used for precoded SRS for uplink CSI, which can be transmitted to same or different transmission points, hence received by same or different Rx beams at gNB. Also, for example, multiple beam sweeping may be used for beam management—apply signal to a set of beams, and sweep through each beam or set of beams. Thus, the beamforming gain (meaning a different beam) may be different on different SRS resources. Thus, according to an example implementation, a flexible linkage may be provided between PUSCH power control parameter set used for PUSCH power control and the SRS power control, e.g., where a PUSCH power control parameter set may be linked to a SRS signal for SRS power control, e.g., based on a match between the PUSCH beam pair and the SRS beam pair, for example.

According to an example implementation, a more accurate SRS power control scheme is provided or described, which may be especially advantageous for operating with flexible beamforming for m-MIMO systems, for example. According to an example implementation, an explicit signaling (control information from the BS to indicate linked PUSCH power control parameter set for SRS signal/SRS resource) or an implicit determination by the UE/user device of the linked PUSCH power control parameter set for SRS signal may be used for determining the linkage of power control parameter set between PUSCH and SRS. In this way, a change of beamforming gain (a different beam pair) for SRS can be compensated for by an appropriately selected linked PUSCH power control parameter set (for use in adjusting SRS transmit power). When multiple SRS resources are configured, the linkage for the power control parameter set between PUSCH and SRS may be determined for each SRS resource on account of flexible beamforming on different SRS resources. For beam management SRS, one PUSCH power control parameter set may be used for linkage for all or multiple SRS signals/SRS resources, e.g., the most recent PUSCH power control parameter set or a default PUSCH power control parameter set may be used for SRS power control, e.g., due to limited information for all the swept beams.

Linkage for power control parameter set between SRS and PUSCH. According to an example implementation, different parameter sets can be used for SRS power control by UE, and the BS may indicate (signal to UE) which power control parameter set will be used for SRS power control. Each parameter can have different values for one or more parameters of the power control parameter set, such as P0, (alpha), pathloss and/or closes loop related parameters, fc, etc.

Thus, for example, to support flexible beamforming for data transmission, different PUSCH power control parameter sets are used for PUSCH with different beam pairs—this may be used to adjust Power of PUSCH signals, e.g., different parameter sets for each PUSCH beam pair. (UL TX/transmit beam for UE, and a UL RX/receive beam for BS). One case: Each beam pair may need a different parameter set. PUSCH A linked PUSCH power control parameter set defines linkage (or relationship) between SRS power and PUSCH power. For multiple PUSCH power control parameter sets, at least one of the PUSCH power control parameters can be different, which may include open loop related parameters, P0, (alpha), pathloss and/or close loop related parameters, fc, etc.

According to an example implementation, a linked PUSCH power control parameter set (one of a plurality of PUSCH power control parameter sets) may be selected to be used for SRS power control, e.g., for each SRS resource or for one or more SRS resources. Selection of a PUSCH power control parameter set for SRS (to be a linked PUSCH power control parameter sets) may include or may involve one or more of the following:

1) determine multiple PUSCH parameters sets for PUSCH power control, one for each PUSCH beam pair
2) Determine a beam pair for each SRS resource (or for one or more SRS resources)
3) determine, for each SRS resource, a linked PUSCH power control parameter set to be used (for SRS power control) to determine power of SRS signal based on the beam pair for PUSCH and beam pair for SRS matching. For example, select, for a given SRS beam pair, a PUSCH parameter set that has a beam pair that matches the SRS beam pair.
4) Explicit option: BS then sends to the UE an index that identifies the PUSCH power control parameter set to be used (for a SRS beam pair).
   A) For example, 2 bits may indicate index to PUSCH power control parameter set—explicit dynamic signaling (e.g., use DCI in PDCC to signal this index)
   B) See Table 1—combined high layer (RRC for example) signaling plus dynamic signaling: SRS parameter set is reported via higher layer (e.g., RRC signaling), and lower layer signaling, e.g., PDCCH DCI may be used to report linked PUSCH power control parameter set.
   C) High level signaling may be slow, e.g., RRC to indicate this index (not as fast as PDCCH DCI), and can be used to report linked PUSCH power control parameter set for periodic SRS, because periodic SRS beam is preconfigured by BS, so before SRS transmission BS may send to UE the linked PUSCH power control parameter set to be used for that beam. PDCCH may be used to report linked PUSCH power control parameter set for aperiodic SRS.
5) Implicit option: beam pair may be included in PUSCH parameter set and SRS parameter sets. Thus, when BS (and UE) knows the beam and PUSCH parameter set for PUSCH transmission, BS now also knows the linked PUSCH parameter set for SRS with same beam pair. Thus, both UE and BS know beam pairs for PUSCH and SRS (e.g., based on a match of beam pairs for SRS and PUSCH), and both UE and BS know linked PUSCH power control parameter set for SRS power control. UE can thus implicitly determine the linked PUSCH power control parameter set for SRS with same beam pair. Thus, in this case, there may be no need to signal index for linked PUSCH power control parameter set for each SRS/SRS resource.

Figure 7:
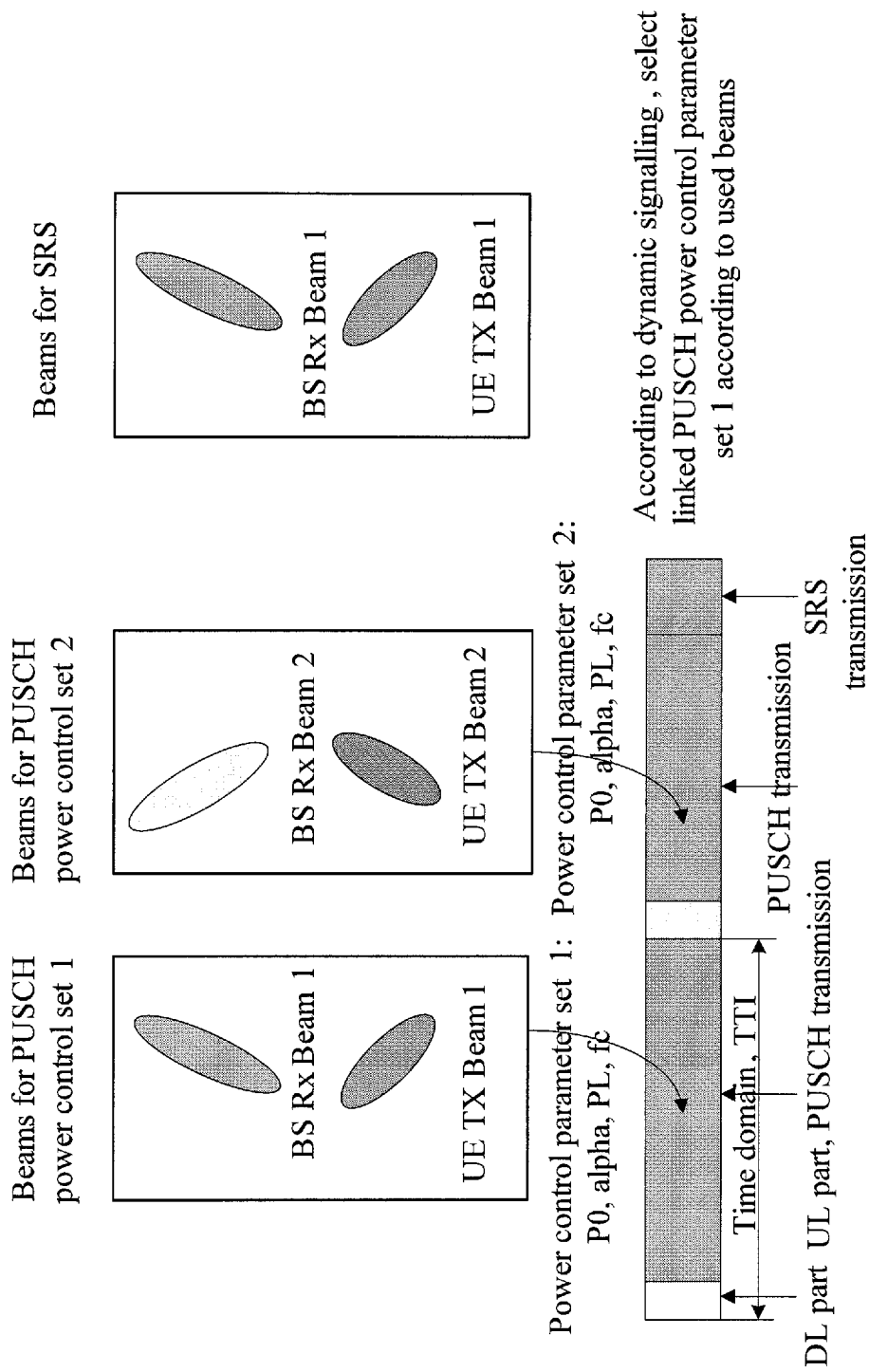
FIG. 7 is a diagram illustrating explicit dynamic signaling according to an example implementation.

FIG. 7 is a diagram illustrating explicit dynamic signaling according to an example implementation. Explicit dynamic signaling indication for linkage. For example, to guarantee fully flexible beamforming for both SRS and PUSCH, dynamic signaling may be used to indicate the linked PUSCH parameter set (which may include of P0, alpha, pathloss, etc.) for determining SRS transmit power. FIG. 7 illustrates an example of dynamic signaling. According to the used beam pair 1 for SRS transmission link, the dynamic signaling indicates to UE the linked PUSCH power control parameter set 1 to be used for SRS power control. For each power control parameter set, there may be one specific offset value between SRS and linked PUSCH. On account of full flexibility, this scheme can be used for power control of aperiodic SRS. In the example shown in FIG. 7, dynamic explicit signaling may be used to signal to UE the use PUSCH power control parameter set 1 corresponding to PUSCH transmit beam 1 and receive beam 1, e.g., based on a match between PUSCH beam pair (TX beam 1/Rx beam 1) and SRS beam pair (TX/transmit beam 1, Rx/receive beam 1).

To trigger aperiodic SRS transmission, the dynamic signaling may be used, e.g., via PDCCH DCI. To provide a good tradeoff between dynamic signaling overhead and flexibility for SRS transmission, high layer signaling (e.g., RRC/radio resource control signaling) may be used with combination of the lower layer (e.g., PDCCH DCI) dynamic signaling. For example, dynamic signaling may indicate SRS transmission parameter set, which is corresponded with one state. For example, a 2 bit dynamic signaling may be used (e.g., see Table 1) to indicate 3 states (a fourth state is no triggering). For each state, SRS transmission parameters are configured (communicated to UE) by the higher layer (e.g., RRC) signaling, e.g., where SRS transmission parameters communicated to UE via higher layer signaling may include transmission comb, starting physical resource block assignment, srs-ConfigIndex, SRS bandwidth, frequency hopping bandwidth, cyclic shift, number of antenna ports, for example. As shown in Table 1, according to an example implementation, an index or value of SRS request field may be used to indicate to UE: 1) a SRS transmission parameter set, 2) a linked PUSCH power control parameter set, and 3) a numerology for a SRS resource. For example, SRS and linked PUSCH with same power control parameter set may typically have the same numerology.

TABLE 1

SRS request field/Index to identify Linked PUSCH Power Control Parameter set for SRS signal (e.g., for dynamic explicit signaling, such as for aperiodic SRS). index or SRS request field may also indicate SRS transmission parameter set, numerology, etc.

| Value of SRS request field Indicated by DCI | Description (SRS parameter set and PUSCH control parameters set by RRC) |
|---|---|
| '00' | No type 1 SRS trigger |
| '01' | The $1^{st}$ SRS transmission parameter set configured by higher layers + $1^{st}$ Linked PUSCH power control parameter set index |
| '10' | The $2^{nd}$ SRS transmission parameter set configured by higher layers + $2^{nd}$ Linked PUSCH power control parameter set index |
| '11' | The $3^{rd}$ SRS transmission parameter set configured by higher layers + $3^{rd}$ Linked PUSCH power control parameter set index |

If transmit and receive beam pair is predefined for SRS transmission, high layer signaling can be used to indicate the index of linked PUSCH power control parameter set. For example, periodic SRS can be used for obtaining CSI for different beam pairs, which are determined by beam management. Based on used beam pair for PUSCH and SRS, gNB can determine the index of PUSCH power control parameter set by the same beam pair.

For example, when the receive beamforming information is not available at UE's side, the signaling (indicating linkage) maybe required for indicating the linked PUSCH power control parameter set for a SRS signal. Also, for example, when all the beam pair information is included in the PUSCH and SRS transmission parameters, the PUSCH power control parameter set used for determining SRS transmit power may be implicitly determined by UE by the principle of the same beam pair between PUSCH and SRS.

Power control for multiple SRS resources. Because different beamforming (different beam pair) may be used for different SRS, the linkage with PUSCH power control parameter set for different SRS resources may (or should) be specified. To perform accurate power control for SRS, the linkage can be determined according to used beam pair for each SRS resource. Thus, the linkage of a PUSCH power control parameter set for SRS power control (for an SRS signal) may be determined per SRS resource. For each resource, this linkage can be obtained, e.g., by explicit signaling (control information sent by BS to indicate linked PUSCH power control parameter set per SRS resource/SRS signal) or by implicit determination (e.g., based on SRS beam pair that matches PUSCH beam pair). If different numerologies are used on different SRS resources, it may be provided by this per SRS resource configuration that the same numerology is used for SRS and linked PUSCH with same power control parameter set. For example, when SRS is transmitted on multiple resources with different frequency band in one OFDM (orthogonal frequency division multiplexing) symbol, the same linkage (same linked PUSCH power control parameter set per SRS) can be assumed on account of guaranteeing good PAPR (peak to average power ratio) property if SC-FDMA (single carrier frequency division multiplex access) is used for power limited user device. That means the UE with SC-FDMA may, for example, receive the same signaling for linkage of PUSCH power control parameter set in (or for) different SRS resources.

Figure 8:
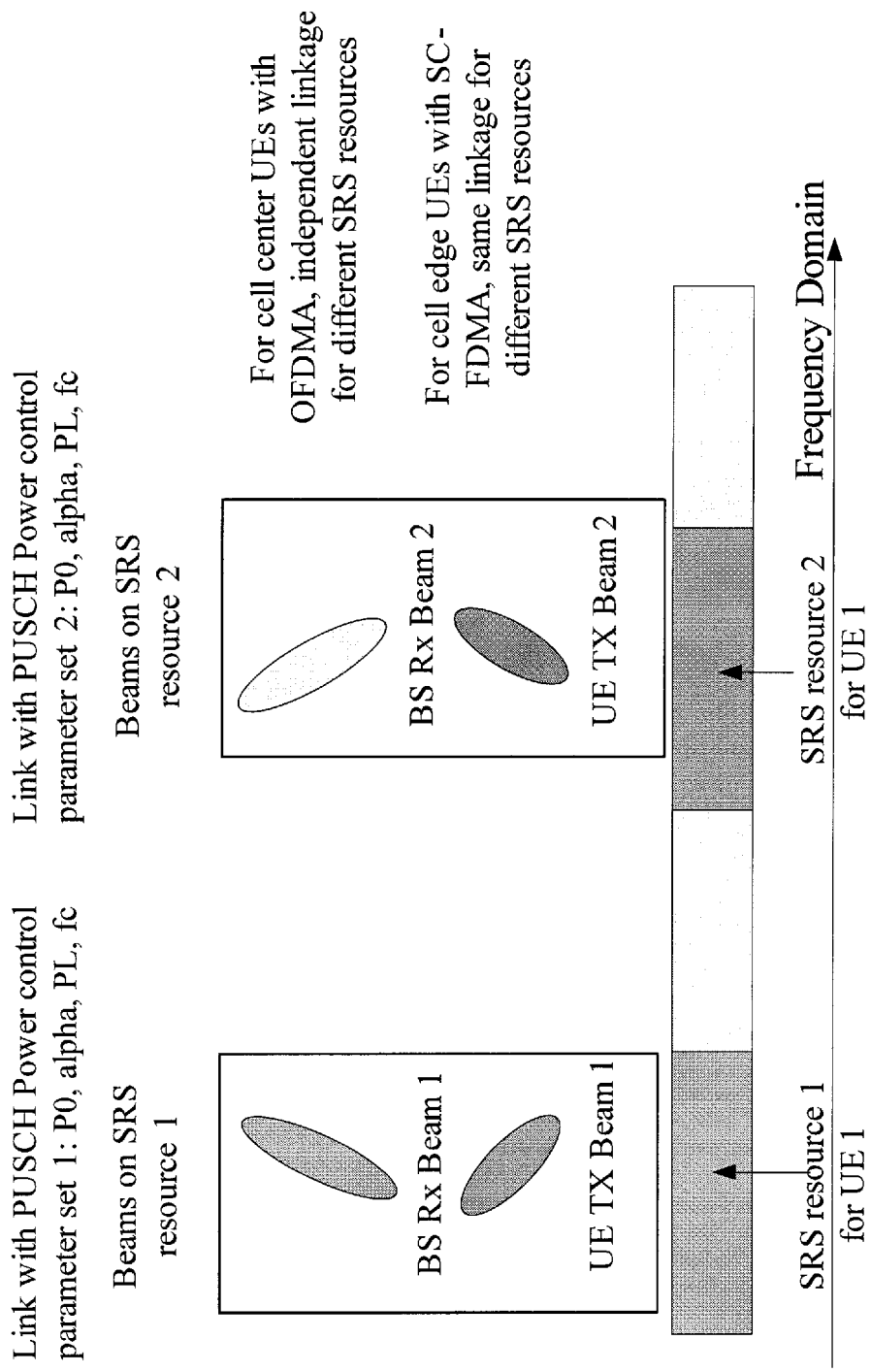
FIG. 8 is a diagram illustrating linkage (or selection) of PUSCH power control parameter set for multiple SRS resources according to an example implementation.

FIG. 8 is a diagram illustrating linkage (or selection) of PUSCH power control parameter set for multiple SRS resources according to an example implementation. For beam management SRS, beam sweeping can be used for beam selection. (e.g., subframe 1 use beam 1; subframe 2 use beam 2, may activate multiple beams per subframe). In this case, the beam quality is not available for both gNB/BS and UE. Moreover, it is not easy to obtain the corresponding PUSCH power control parameter sets for all the beams. Thus, according to an example implementation, the same PUSCH power control parameter set may be used for this kind of SRS (for all or multiple SRS signals) even with different beams/beam pairs for the different SRS resources. UE and BS do not necessarily know which beam is best or preferred, since the point of beam management is to determine updated preferred beam(s) for UL (UE TX beam, and BS RX beam), for example. For simplicity, the PUSCH power control parameter set (used for SRS signals) can be linked to that most recently correctly transmitted PUSCH (UE already knows the previously successfully used PUSCH power control parameter set for UL data transmission, e.g., during previous time instance—known implicitly by both UE and BS), or one default PUSCH power control parameter set may be linked, or one indicated PUSCH power control parameter set to be signaled by BS to UE e.g., via RRC signaling. For an example default PUSCH power control parameter set, it may be linked with wide beam for robust transmission. Here, just one SRS resource is assumed for beam management.

Various illustrative features or example implementations may include one or more of the following, by way of illustrative example(s):

1) BS and UE may determine linked PUSCH power control parameter set(s) for determining SRS transmission power according to used transmit and receive beam for PUSCH and SRS; (e.g., based on SRS beam pair matching a PUSCH beam pair); different configurations.

A) Dynamic explicit signaling by PDCCH DCI to indicate the index of linked PUSCH power control parameter set B) Implicit principle/determination for UE to determine link relation or linked PUSCH power control parameter set for SRS based on a match of PUSCH and SRS beam pairs.

2) Linkage between PUSCH power control parameters for SRS and PUSCH is determined for each SRS resource (e.g., based on SRS beam pair matching a PUSCH beam pair);

3) The same PUSCH power control parameter set may be used for beam management SRS with beam sweeping. A UE may use one linked PUSCH power control parameter set for multiple SRS beam pairs (e.g., for SRS beam pairs 1-4, use PUSCH parameter set for PUSCH beam 1).

(A) use PUSCH power control parameter set used for previous or most recent PUSCH data transmission (known by both BS and UE) for multiple SRS resources/SRS beam pairs.

B) Use a signaled (indicated by BS to UE) PUSCH power control parameter set for multiple SRS resources/SRS beam pairs C) Use a default (known by both BS and UE) PUSCH power control parameter set for multiple SRS resources/SRS beam pairs 4) Additional signaling may be used for indicating (from BS to UE) numerology for SRS transmission. SRS and linked PUSCH with same power control parameter set (should have) have the same numerology. Different numerology may have different linkage/linked PUSCH parameters set) (where numerology may include, e.g., subcarrier spacing, subframe length (time), time domain (OFDM symbol time period) and frequency domain (subcarrier spacing), transmission power, different beam widths. Numerology may include fundamental time/frequency characteristics. Multiple SRS resources for numerology 1, and multiple SRS resources for numerology 2. For SRS transmission—may need to include SRS resources for two different numerologies, such as, for example, different beam/beam widths, maybe different transmission power, etc. BS may indicate numerology to UE via high level/RRC signaling, e.g., within SRS transmission parameter set. BS may indicate linkage (linked PUSCH power control parameter set for SRS signal) and the numerology that the linkage applies to.

Figure 9:
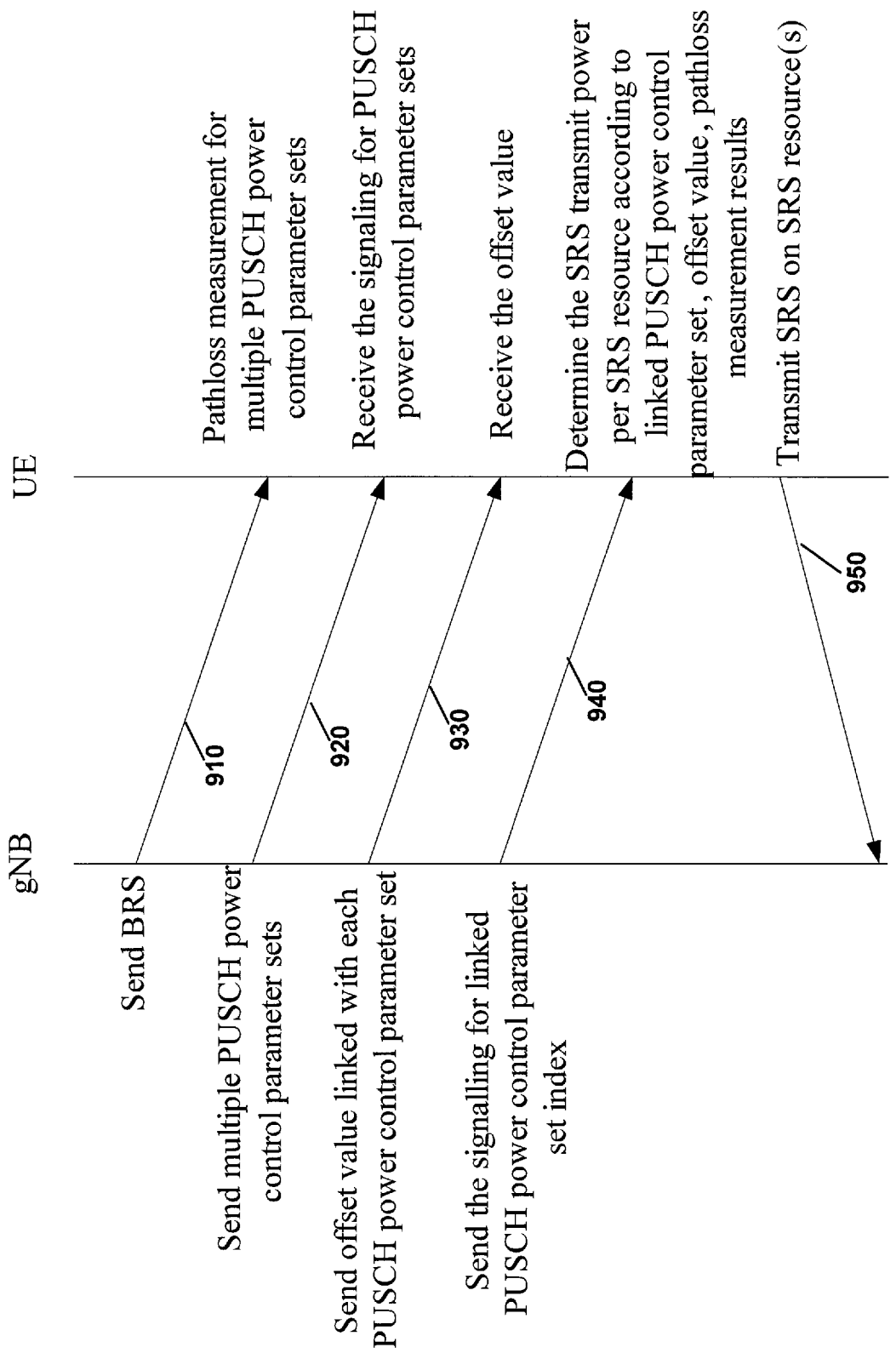
FIG. 9 is a diagram illustrating operation of a base station and user device (UE) according to another example implementation.

FIG. 9 is a diagram illustrating operation of a base station and user device (UE) according to another example implementation. From BS's side, BS sends power control related information to allow UE to transmit SRS with suitable SRS transmit power. From UE's side, UE makes measurements and sets/adjusts SRS transmit power, e.g., according to gNB's/BS's indication, including dynamic and semi-static signaling.

At 910, the gNB (BS) sends/transmits a reference signal, e.g., such as beam reference signal (BRS) or a channel state information-reference signal (CSI-RS) via one or more beams/beam pairs, for UE pathloss measurement. The UE then performs pathloss (PL) measurement for each of a plurality of beam pairs, for example. For example, UE may perform RSRP (reference signal received power) measurement based on received CSI-RS and obtains pathloss for each PUSCH beam pair and each PUSCH power control parameter set.

At 920, the gNB/BS determines and sends via RRC multiple PUSCH power control parameter sets (values for each parameter, for each parameter set) for PUSCH with different transmit and receive beam pair, including open loop part, P0, a and close loop part fc and sends these parameters to UE by higher layer (open loop part is sent via RRC) and physical or lower layer signaling (e.g., fc may be sent via PDCCH/DCI). UE receives the signaling for multiple PUSCH power control parameter sets and related offset values.

At 930, for each PUSCH power control parameter set, gNB/BS configures one power offset (e.g., SRS power offset) value between SRS and linked PUSCH by high layer signaling (e.g., via RRC signaling); e.g., may share 1 offset value for all PUSCH power control parameter sets, or may have different offset values for different PUSCH power control parameter sets. At 930, the UE determines transmit power for each SRS resource based on gNb's signalling and pathloss measurement results according to the following formula, for example: (linked PUSCH power control parameter set may be signalled explicitly or may be determined implicitly—for parameter set k):

$$P_{SRS,c}(i) = \min\{P_{CMAX,c}(i), P_{SRS\_OFFSET,c,k}(m) + 10 \log_{10}(M_{SRS,c}) + P_{O\_PUSCH,c,k}(j) + \alpha_{c,k}(j) + \alpha_{c,k}(j) \cdot PL_{c,k} + f_c(i)\} \text{ [dBm]},$$

Where $P_{O\_PUSCH,c,k}(j)$, $\alpha_{c,k}(j)$ is indicated by RRC signalling, $PL_{c,k}$ is obtained by UE measurement, $f_{c,k}(i)$ is derived by TPC (transmission point) signalling. These parameters are obtained from the PUSCH parameter set k. For the power control parameter set index, this information may be indicated by gNb/BS with dynamic (lower layer, e.g., PDCCH DCI) or higher layer signalling (e.g., RRC signaling). Note: For beam management SRS, only one linked PUSCH parameter set may be used to determine SRS transmission power, although swept beams may be used for SRS transmission. It can be one default PUSCH power control parameter set or most recently used parameter set for correctly transmitted PUSCH, for example.

At 940, for each SRS resource, gNB/BS sends signaling to indicate the linked PUSCH power control parameter set for UE to determine SRS transmit power according to used beam pair (transmit and receive beams) for SRS transmission that matches a PUSCH beam pair. For aperiodic SRS, dynamic signaling (PDCCH/DCI) may be used to indicate the index of linked PUSCH power control parameter set. The index of linked PUSCH power control parameter set can be included along with indication of the SRS transmit parameter set for each state indicated by dynamic signaling. For periodic SRS, semi-static signaling (RRC) can be used to indicate the index of PUSCH power control parameter set. Implicit option—no signaling for this is necessary, but UE making a determination of linkage (linked PUSCH power control parameter set for SRS) based on PUSCH beam pair and SRS beam pair that match.

At 950, the UE transmits each SRS signal via the corresponding SRS resource and at the determined SRS transmit power, e.g., based on selected/linked PUSCH power control parameter set.

Figure 10:
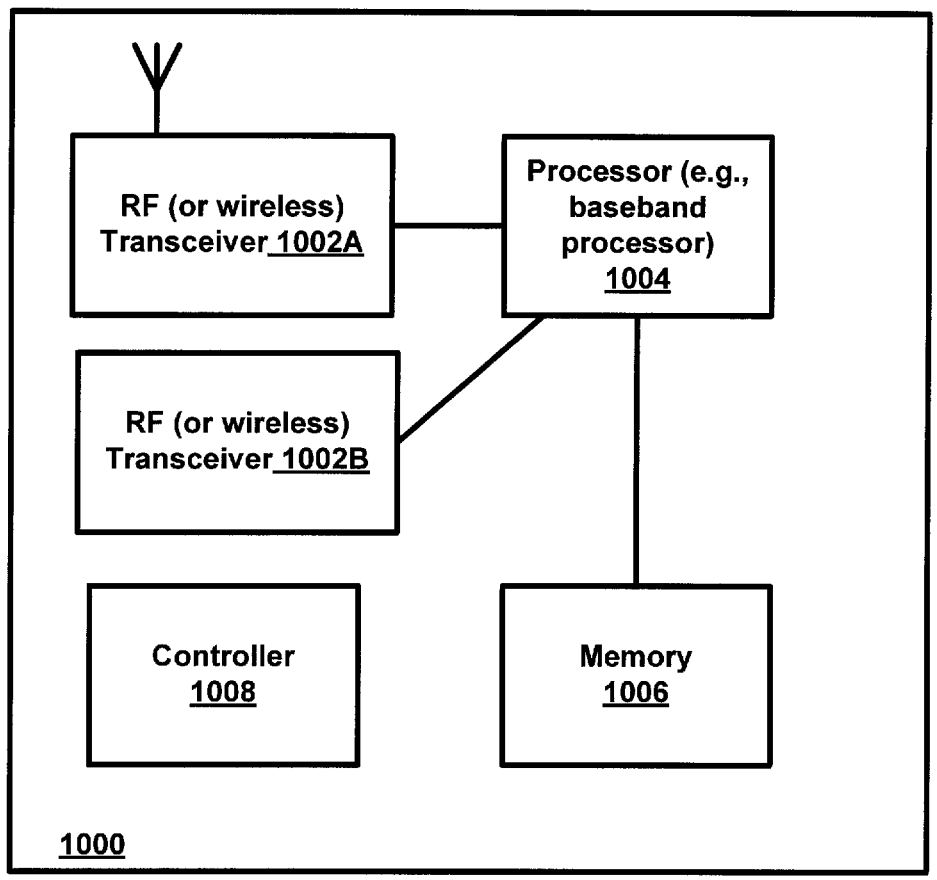
FIG. 10 is a block diagram of a node or wireless station (e.g., base station/access point or mobile station/user device) according to an example implementation.

Various example implementations may have one or more advantages, such as, for example: Perform accurate power control for SRS and reduce power consumption and inter-cell interference; may provide compatibility with flexible configuration for SRS; Support more users with limit SRS resource;

FIG. 10 is a block diagram of a wireless station (e.g., AP or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:
1. A method comprising:
   determining, by a base station, an uplink data channel power control parameter set for an uplink data channel beam pair;

determining, by the base station, a sounding reference signal beam pair for a sounding reference signal resource;

selecting, by the base station, the uplink data channel power control parameter set to be used by a user device to adjust a sounding reference signal transmission power, the selecting being performed based on the uplink data channel beam pair matching the sounding reference signal beam pair; and receiving, by the base station from the user device via the sounding reference signal resource and the sounding reference signal beam pair, a sounding reference signal with a sounding reference signal transmission power set based on the uplink data channel power control parameter set.

2. The method of claim 1 wherein:

the determining an uplink data channel power control parameter set comprises determining an uplink data channel power control parameter set for each of a plurality of uplink data channel beam pairs, including determining a first uplink data channel power control parameter set for a first uplink data channel beam pair and a second uplink data channel power control parameter set for a second uplink data channel beam pair;

the determining a sounding reference signal beam pair for a sounding reference signal resource comprises determining a sounding reference signal beam pair for each of a plurality of sounding reference signal resources, including:

determining a first sounding reference signal beam pair for a first sounding reference signal resource; and determining a second sounding reference signal beam pair for a second sounding reference signal resource; and the selecting comprises:

selecting, based on a match between the first uplink data channel beam pair and the first sounding reference signal beam pair, the first uplink data channel power control parameter set for the first uplink data channel beam pair to be used by the user device to adjust a sounding reference signal transmission power for the first sounding reference signal resource; and selecting, based on a match between the second uplink data channel beam pair and the second sounding reference signal beam pair, the second uplink data channel power control parameter set for the second uplink data channel beam pair to be used by the user device to adjust a sounding reference signal transmission power for the second sounding reference signal resource.

3. The method of claim 1 wherein the uplink data channel power control parameter set for an uplink data channel beam pair comprises a physical uplink shared channel (PUSCH) power control parameter set for a PUSCH beam pair.

4. The method of claim 1 and further comprising:

sending, by the base station to the user device, a control information identifying the uplink data channel power control parameter set to be used to adjust the sounding reference signal transmission power.

5. The method of claim 4 wherein:

the control information is sent via higher layer signaling for periodic sounding reference signal; and the control information is sent via lower layer signaling for aperiodic sounding reference signal.

6. The method of claim 4 wherein:

the control information is sent via a radio resource control (RRC) signaling for periodic sounding reference signal; and the control information is sent via a physical downlink control channel (PDCCH) downlink control information (DCI) for aperiodic sounding reference signal.

7. The method of claim 4 wherein:

the control information comprises control information, provided via physical downlink control channel (PDCCH) downlink control information (DCI), that identifies: 1) a sounding reference signal parameter set, which was configured by a higher layer signaling, to be used for transmitting the sounding reference signal, and 2) the uplink data channel power control parameter set to be used to adjust the sounding reference signal transmission power.

8. The method of claim 1 and further comprising:

sending, by the base station to the user device, information identifying a numerology to be used by the user device for sounding reference signal transmission.

9. The method of claim 1 and further comprising:

sending, by the base station to the user device, information identifying a power offset for the sounding reference signal transmission power with respect to the uplink data channel.

10. The method of claim 1 and further comprising:

sending, by the base station to the user device, channel state information-reference signals to allow the user device to determine a pathloss for one or more beam pairs.

11. An apparatus comprising at least one processor and at least one memory including computer instructions, when executed by the at least one processor, cause the apparatus to perform:

determining an uplink data channel power control parameter set for an uplink data channel beam pair;

determining a sounding reference signal beam pair for a sounding reference signal resource;

selecting the uplink data channel power control parameter set to be used by a user device to adjust a sounding reference signal transmission power, the selecting being performed based on the uplink data channel beam pair matching the sounding reference signal beam pair; and receiving, from the user device via the sounding reference signal resource and the sounding reference signal beam pair, a sounding reference signal with a sounding reference signal transmission power set based on the uplink data channel power control parameter set.

12. An apparatus comprising means for performing:

determining an uplink data channel power control parameter set for an uplink data channel beam pair;

determining a sounding reference signal beam pair for a sounding reference signal resource;

selecting the uplink data channel power control parameter set to be used by a user device to adjust a sounding reference signal transmission power, the selecting being performed based on the uplink data channel beam pair matching the sounding reference signal beam pair; and receiving, from the user device via the sounding reference signal resource and the sounding reference signal beam pair, a sounding reference signal with a sounding reference signal transmission power set based on the uplink data channel power control parameter set.

13. An apparatus comprising a computer program product including a non-transitory computer-readable storage medium and storing executable code that, when executed by at least one data processing apparatus, is configured to cause the at least one data processing apparatus to perform:

determining an uplink data channel power control parameter set for an uplink data channel beam pair;
determining a sounding reference signal beam pair for a sounding reference signal resource;
selecting the uplink data channel power control parameter set to be used by a user device to adjust a sounding reference signal transmission power, the selecting being performed based on the uplink data channel beam pair matching the sounding reference signal beam pair; and
receiving, from the user device via the sounding reference signal resource and the sounding reference signal beam pair, a sounding reference signal with a sounding reference signal transmission power set based on the uplink data channel power control parameter set.

14. A method comprising:
receiving, by a user device from a base station, an uplink data channel power control parameter set for an uplink data channel beam pair;
determining, by the user device, a sounding reference signal beam pair for a sounding reference signal resource;
selecting, by the user device, the uplink data channel power control parameter set to adjust a sounding reference signal transmission power;
adjusting, by the user device based on the uplink data channel power control parameter set, a sounding reference signal transmission power for a sounding reference signal to be transmitted via the sounding reference signal resource; and
transmitting, by the user device, the power-adjusted sounding reference signal via the sounding reference signal resource and the sounding reference signal beam pair.

15. The method of claim 14 wherein:
the receiving an uplink data channel power control parameter set comprises receiving an uplink data channel power control parameter set for each of a plurality of uplink data channel beam pairs, including:
receiving a first uplink data channel power control parameter set for a first uplink data channel beam pair; and
receiving a second uplink data channel power control parameter set for a second uplink data channel beam pair;
the determining a sounding reference signal beam pair comprises determining a sounding reference signal beam pair for each of a plurality of sounding reference signal resources, including:
determining a first sounding reference signal beam pair for a first sounding reference signal resource; and
determining a second sounding reference signal beam pair for a second sounding reference signal resource;
wherein the selecting comprises selecting, the first uplink data channel power control parameter set to adjust a sounding reference signal transmission power for the first sounding reference signal resource and the second uplink data channel power control parameter set to adjust a sounding reference signal transmission power for the second sounding reference signal resource.

16. The method of claim 14 wherein the selecting comprises: determining, by the user device, that the uplink data channel beam pair matches the sounding reference signal beam pair; and
selecting, by the user device based on the uplink data channel beam pair matching the sounding reference signal beam pair, the uplink data channel power control parameter set to adjust a sounding reference signal transmission power.

17. The method of claim 14 wherein the selecting comprises: receiving, by the user device from the base station, a control information indicating that the uplink data channel power control parameter set should be used to adjust a sounding reference signal transmission power; and
selecting, by the user device based on the received control information, the uplink data channel power control parameter set to adjust a sounding reference signal transmission power.

18. The method of claim 14 wherein the uplink data channel power control parameter set for an uplink data channel beam pair comprises a physical uplink shared channel (PUSCH) power control parameter set for a PUSCH beam pair.

19. The method of claim 17 wherein:
the control information is received via higher layer signaling for periodic sounding reference signal; and
the control information is received via lower layer signaling for aperiodic sounding reference signal.

20. The method of claim 17 wherein:
the control information is received via a radio resource control (RRC) signaling for periodic sounding reference signal; and
the control information is received via a physical downlink control channel (PDCCH) downlink control information (DCI) for aperiodic sounding reference signal.

21. The method of claim 17 wherein:
the control information comprises control information, provided via physical downlink control channel (PDCCH) downlink control information (DCI), that identifies: 1) a sounding reference signal parameter set, which was configured by a higher layer signaling, to be used for transmitting the sounding reference signal, and 2) the uplink data channel power control parameter set to be used to adjust the sounding reference signal transmission power.

22. The method of claim 14 and further comprising:
receiving, by the user device, information identifying a numerology to be used by the user device for sounding reference signal transmission;
receiving, by the user device, information identifying a power offset for the sounding reference signal transmission power with respect to the uplink data channel; and
receiving, by the user device, channel state information-reference signals to allow the user device to determine a pathloss corresponding to the sounding reference signal beam pair;
determining a pathloss corresponding to the sounding reference signal beam pair based on the channel state information-reference signals; and
wherein the adjusting comprises adjusting, by the user device, a sounding reference signal transmission power based on the uplink data channel power control parameter set, the numerology, the power offset, and the pathloss.

23. The method of claim 14 and further comprising:
receiving, by the user device, information identifying a numerology to be used by the user device for sounding reference signal transmission, wherein the sounding reference signal and the uplink data channel that use a same beam pair have the same numerology.

24. The method of claim 14 and further comprising:
using one uplink data channel power control parameter set to adjust sounding reference signal transmission power for each of a plurality of sounding reference signal beams when performing beam sweeping for beam management.

25. The method of claim 24 wherein the one uplink data channel power control parameter set comprises an uplink data channel power control parameter set that was used to transmit uplink data to the base station via the uplink data channel.

26. An apparatus comprising at least one processor and at least one memory including computer instructions, when executed by the at least one processor, cause the apparatus to perform:
receive, from a base station, an uplink data channel power control parameter set for an uplink data channel beam pair;
determine a sounding reference signal beam pair for a sounding reference signal resource;
select the uplink data channel power control parameter set to adjust a sounding reference signal transmission power;
adjust based on the uplink data channel power control parameter set, a sounding reference signal transmission power for a sounding reference signal to be transmitted via the sounding reference signal resource; and
transmit the power-adjusted sounding reference signal via the sounding reference signal resource and the sounding reference signal beam pair.

27. An apparatus comprising means for performing:
receiving, from a base station, an uplink data channel power control parameter set for an uplink data channel beam pair;
determining a sounding reference signal beam pair for a sounding reference signal resource;
selecting the uplink data channel power control parameter set to adjust a sounding reference signal transmission power;
adjusting based on the uplink data channel power control parameter set, a sounding reference signal transmission power for a sounding reference signal to be transmitted via the sounding reference signal resource; and
transmitting the power-adjusted sounding reference signal via the sounding reference signal resource and the sounding reference signal beam pair.

28. A method comprising:
selecting, by a user device independently for each of a plurality of sounding reference signal resources, an uplink data channel power control parameter set for an uplink data channel beam pair to be used to adjust a sounding reference signal transmission power for a sounding reference signal beam pair;
adjusting, by the user device for each of a plurality of sounding reference signal resources based on a selected uplink data channel power control parameter set, a sounding reference signal transmission power for a sounding reference signal; and
transmitting, by the user device, each of a plurality of power-adjusted sounding reference signals via a corresponding sounding reference signal resource and a corresponding sounding reference signal beam pair.

29. The method of claim 28 wherein the selecting comprises: determining independently for each of a plurality of sounding reference signal resources, that an uplink data channel beam pair matches a sounding reference signal beam pair; and
selecting, by the user device based on the uplink data channel beam pair matching the sounding reference signal beam pair, the uplink data channel power control parameter set for an uplink data channel beam pair to adjust a sounding reference signal transmission power for a sounding reference signal having a sounding reference signal beam pair that matches the uplink data channel beam pair.

30. The method of claim 28 wherein the selecting comprises:
receiving, by the user device from the base station, a control information indicating, for each of a plurality of sounding reference signal resources, an uplink data channel power control parameter set to be used to adjust a sounding reference signal transmission power; and
selecting, by the user device based on the received control information for each of the plurality of sounding reference signal resources, the uplink data channel power control parameter set to adjust a sounding reference signal transmission power.

31. The method of claim 28 wherein an uplink data channel power control parameter set for each uplink data channel beam pair comprises a physical uplink shared channel (PUSCH) power control parameter set for a PUSCH beam pair.

32. An apparatus comprising means for performing:
selecting, independently for each of a plurality of sounding reference signal resources, an uplink data channel power control parameter set for an uplink data channel beam pair to be used to adjust a sounding reference signal transmission power for a sounding reference signal beam pair;
adjusting, for each of a plurality of sounding reference signal resources based on a selected uplink data channel power control parameter set, a sounding reference signal transmission power for a sounding reference signal; and
transmitting each of a plurality of power-adjusted sounding reference signals via a corresponding sounding reference signal resource and a corresponding sounding reference signal beam pair.

33. An apparatus comprising at least one processor and at least one memory including computer instructions, when executed by the at least one processor, cause the apparatus to:
select, independently for each of a plurality of sounding reference signal resources, an uplink data channel power control parameter set for an uplink data channel beam pair to be used to adjust a sounding reference signal transmission power for a sounding reference signal beam pair;
adjust, for each of a plurality of sounding reference signal resources based on a selected uplink data channel power control parameter set, a sounding reference signal transmission power for a sounding reference signal; and
transmit each of a plurality of power-adjusted sounding reference signals via a corresponding sounding reference signal resource and a corresponding sounding reference signal beam pair.

* * * * *